US012639320B1

(12) United States Patent
Selvaraj et al.

(10) Patent No.: US 12,639,320 B1
(45) Date of Patent: May 26, 2026

(54) ANSWERING A QUERY ABOUT SOURCE CODE BY AUGMENTING THE QUERY WITH INFORMATION RETRIEVED USING CODE METADATA SIMILAR TO THE QUERY

(71) Applicant: Oracle International Corporation, Redwood Shores, CA (US)

(72) Inventors: Guru Selvaraj, Telangana (IN); Kyasaram Vishwa Prasad, Telangana (IN); Jagannadha Prasad Srinivas Vadlamani, Telangana (IN); Leena Daptardar, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/038,919

(22) Filed: Jan. 28, 2025

(51) Int. Cl.
   *G06F 16/2457* (2019.01)
   *G06F 16/242* (2019.01)
   *G06F 16/248* (2019.01)

(52) U.S. Cl.
   CPC ...... *G06F 16/24578* (2019.01); *G06F 16/243* (2019.01); *G06F 16/248* (2019.01)

(58) Field of Classification Search
   None
   See application file for complete search history.

(56) References Cited

U.S. PATENT DOCUMENTS

| 12,399,889 B1 * | 8/2025 | Hensley | .............. | G06F 16/2379 |
| 12,406,072 B2 * | 9/2025 | Chan | ..................... | G06N 3/044 |

| 12,517,879 B1 * | 1/2026 | Engels | ................ | G06F 16/2237 |
| 2025/0199786 A1 * | 6/2025 | Silver | ................... | G06F 8/4441 |
| 2025/0238629 A1 * | 7/2025 | Malkiel | ................ | G06F 40/194 |
| 2025/0272089 A1 * | 8/2025 | Collado | ................ | G06N 3/045 |
| 2025/0272397 A1 * | 8/2025 | Collado | .................... | G06F 8/73 |
| 2025/0278249 A1 * | 9/2025 | Cambronero Sánchez | ................ | G06F 8/30 |
| 2025/0278419 A1 * | 9/2025 | Mui | ...................... | G06F 40/295 |

(Continued)

OTHER PUBLICATIONS

Generating Unit Tests From Source Code Using Large Language Models, Vector Databases, and Prompt Engineering (Year: 2024).*

(Continued)

*Primary Examiner* — Kim T Nguyen
(74) *Attorney, Agent, or Firm* — Invoke

(57) ABSTRACT

Systems, methods, and computer-readable media are provided for intelligent code integration, deployment, and analysis. An example intelligent code analysis system is configured to access and maintain an issue knowledge base storing information about code issues and/or issue resolutions associated with one or more software pipelines managed by the system. The system may process a natural language request about one or more code issues, issue resolutions, and/or sets of code. The system may additionally or alternatively analyze code issues to determine sets of code that should be newly associated with the issues, and/or analyze sets of code to determine issues that should be newly associated with the sets of code. The system generates a prompt that includes content from the natural language request, information about code issues, and/or information about sets of code. The system prompts a large language model (LLM) with the prompt and provides a response for the natural language request based on a result of execution of the prompt by the LLM.

23 Claims, 15 Drawing Sheets

(56) References Cited

U.S. PATENT DOCUMENTS

| | | | |
|---|---|---|---|
| 2025/0291700 A1* | 9/2025 | Hemadri | G06F 11/3476 |
| 2025/0307648 A1* | 10/2025 | Nguyen | G06N 3/045 |
| 2025/0321856 A1* | 10/2025 | Chandramohan | G06F 11/3608 |
| 2026/0010963 A1* | 1/2026 | Karmakar | G06Q 50/16 |
| 2026/0017526 A1* | 1/2026 | Gao | G06N 3/09 |
| 2026/0023745 A1* | 1/2026 | Karmakar | G06Q 50/16 |
| 2026/0030679 A1* | 1/2026 | Robinson | G06Q 40/06 |
| 2026/0037953 A1* | 2/2026 | Jayaraman | G06Q 20/3274 |
| 2026/0037996 A1* | 2/2026 | Singh | G06Q 30/0203 |
| 2026/0039568 A1* | 2/2026 | Qian | H04L 41/5074 |

OTHER PUBLICATIONS

From Word Vectors to Multimodal Embeddings: Techniques, Applications, and Future Directions for Large Language Models (Year : 2024).*

* cited by examiner

Figure 1A:
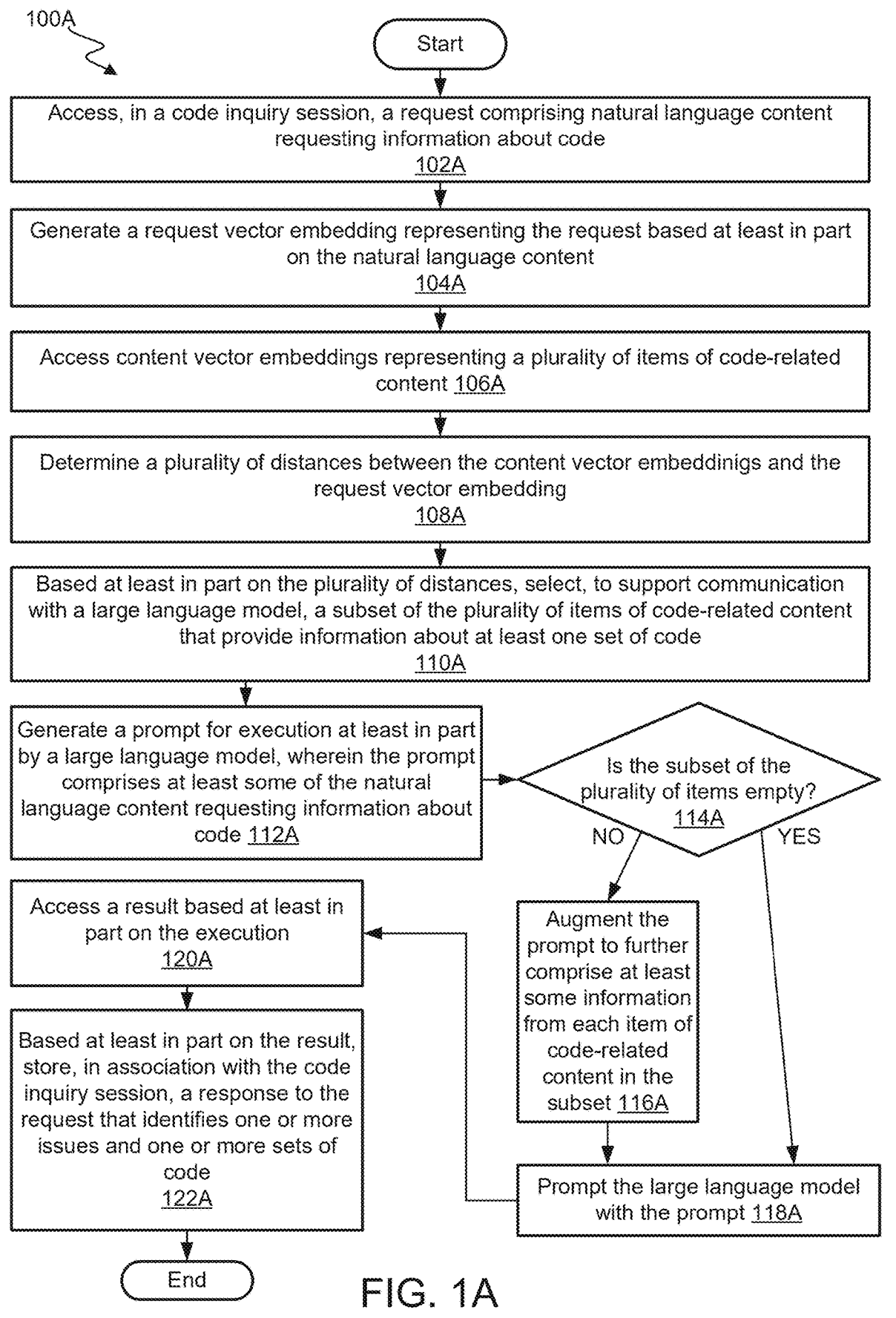

100A

Start

Access, in a code inquiry session, a request comprising natural language content requesting information about code
102A Generate a request vector embedding representing the request based at least in part on the natural language content
104A Access content vector embeddings representing a plurality of items of code-related content 106A Determine a plurality of distances between the content vector embeddinigs and the request vector embedding
108A Based at least in part on the plurality of distances, select, to support communication with a large language model, a subset of the plurality of items of code-related content that provide information about at least one set of code
110A Generate a prompt for execution at least in part by a large language model, wherein the prompt comprises at least some of the natural language content requesting information about code 112A Is the subset of the plurality of items empty?
114A
NO          YES Access a result based at least in part on the execution
120A Augment the prompt to further comprise at least some information from each item of code-related content in the subset 116A Based at least in part on the result, store, in association with the code inquiry session, a response to the request that identifies one or more issues and one or more sets of code
122A Prompt the large language model with the prompt 118A End

Figure 1B:
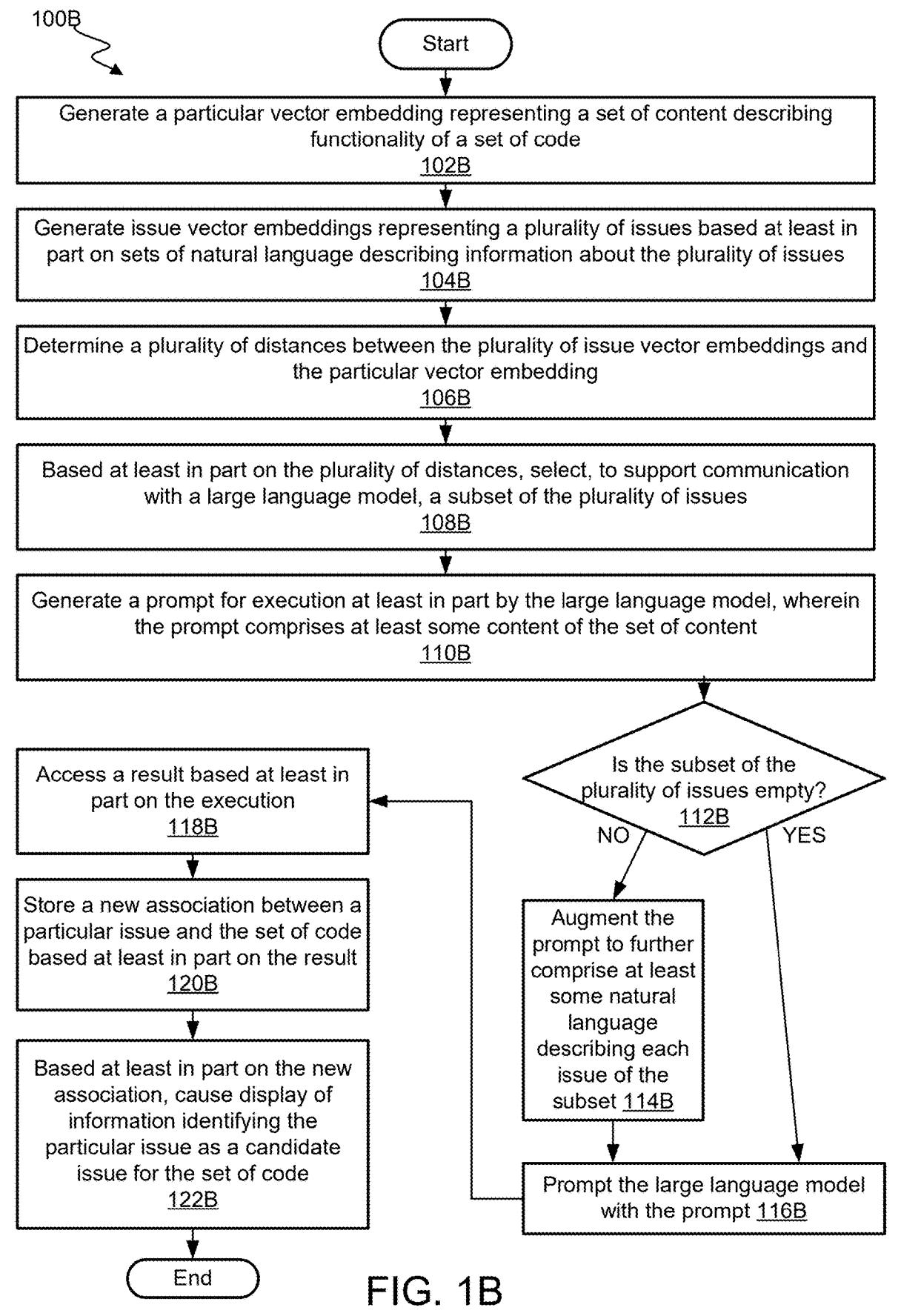

```
                          ( Start )
                              │
                              ▼
┌─────────────────────────────────────────────────────────┐
│  Generate a particular vector embedding representing a    │
│      set of content describing functionality of a set     │
│                        of code                            │
│                         102B                              │
└─────────────────────────────────────────────────────────┘
                              │
                              ▼
┌─────────────────────────────────────────────────────────┐
│  Generate issue vector embeddings representing a          │
│  plurality of issues based at least in part on sets of    │
│  natural language describing information about the        │
│                  plurality of issues                      │
│                         104B                              │
└─────────────────────────────────────────────────────────┘
                              │
                              ▼
┌─────────────────────────────────────────────────────────┐
│  Determine a plurality of distances between the           │
│  plurality of issue vector embeddings and the particular  │
│                   vector embedding                        │
│                         106B                              │
└─────────────────────────────────────────────────────────┘
                              │
                              ▼
┌─────────────────────────────────────────────────────────┐
│  Based at least in part on the plurality of distances,    │
│  select, to support communication with a large language   │
│         model, a subset of the plurality of issues        │
│                         108B                              │
└─────────────────────────────────────────────────────────┘
                              │
                              ▼
┌─────────────────────────────────────────────────────────┐
│  Generate a prompt for execution at least in part by the  │
│  large language model, wherein the prompt comprises at    │
│           least some content of the set of content        │
│                         110B                              │
└─────────────────────────────────────────────────────────┘
```

Is the subset of the plurality of issues empty?
112B

NO        YES

Access a result based at least in part on the execution
118B

Store a new association between a particular issue and the set of code based at least in part on the result
120B Based at least in part on the new association, cause display of information identifying the particular issue as a candidate issue for the set of code
122B Augment the prompt to further comprise at least some natural language describing each issue of the subset 114B Prompt the large language model with the prompt 116B ( End )

Figure 1C:
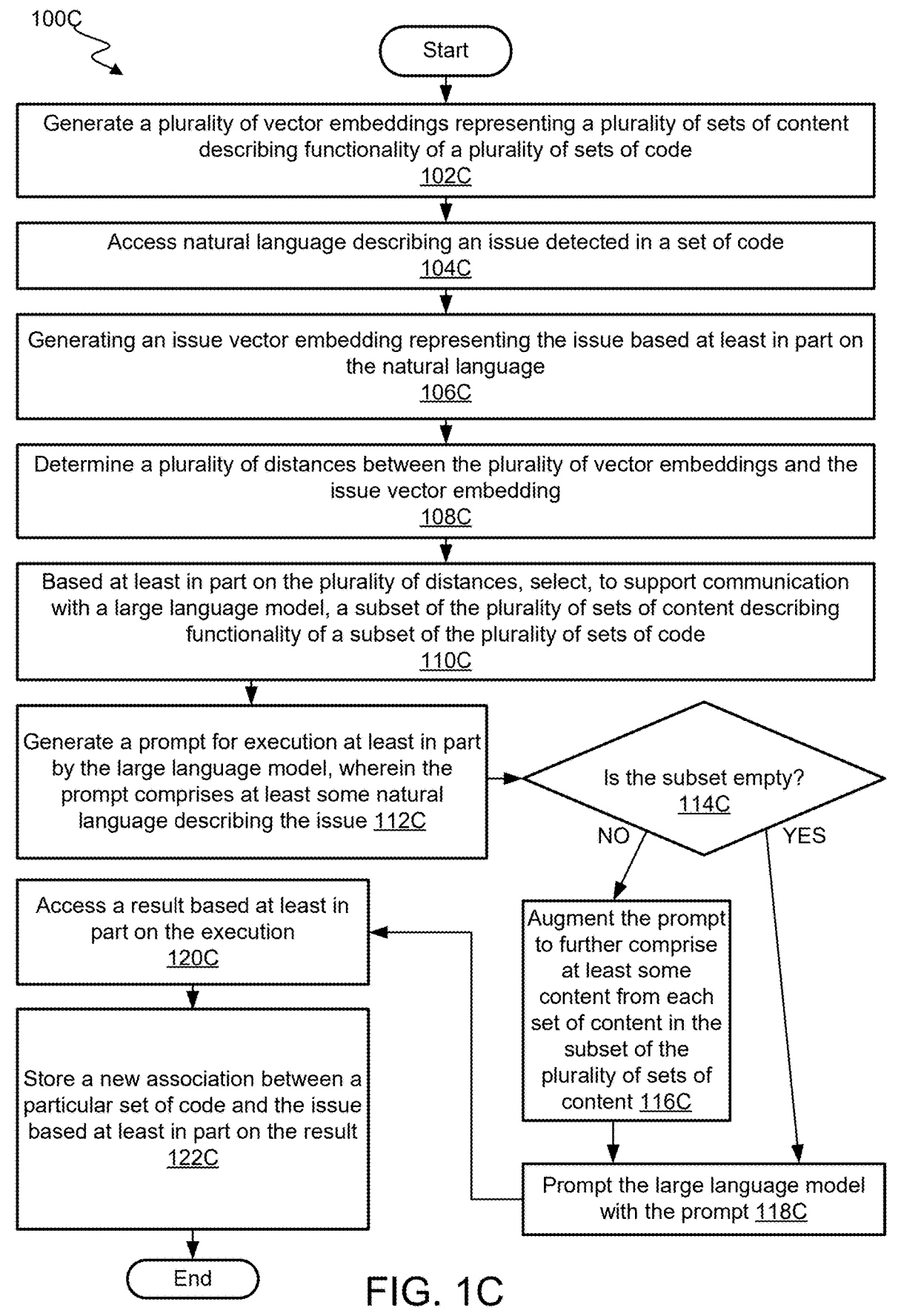

Start

Generate a plurality of vector embeddings representing a plurality of sets of content describing functionality of a plurality of sets of code
102C Access natural language describing an issue detected in a set of code
104C Generating an issue vector embedding representing the issue based at least in part on the natural language
106C Determine a plurality of distances between the plurality of vector embeddings and the issue vector embedding
108C Based at least in part on the plurality of distances, select, to support communication with a large language model, a subset of the plurality of sets of content describing functionality of a subset of the plurality of sets of code
110C Generate a prompt for execution at least in part by the large language model, wherein the prompt comprises at least some natural language describing the issue 112C Is the subset empty?
114C

NO        YES

Access a result based at least in part on the execution
120C

Store a new association between a particular set of code and the issue based at least in part on the result
122C Augment the prompt to further comprise at least some content from each set of content in the subset of the plurality of sets of content 116C Prompt the large language model with the prompt 118C

End

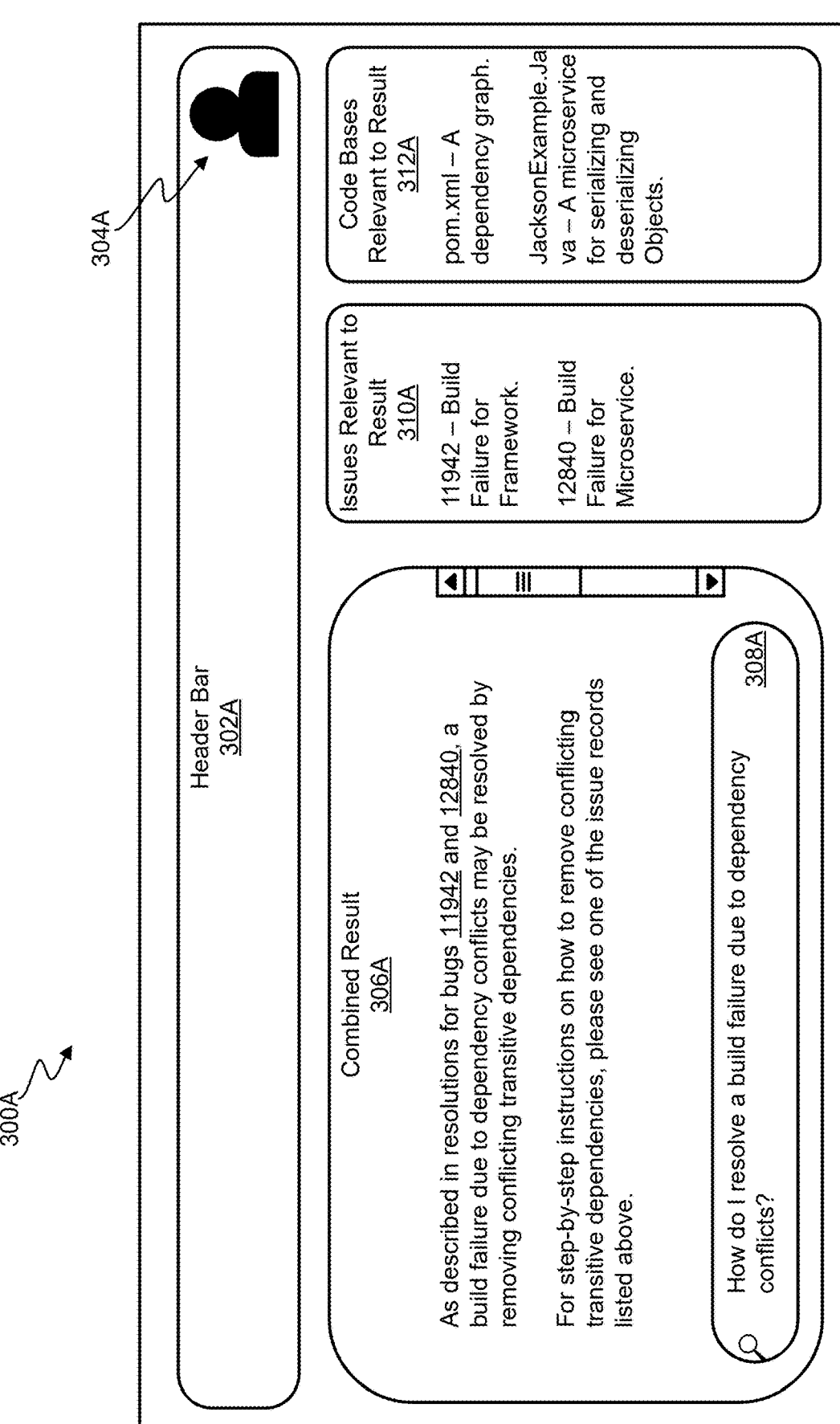

Header Bar 302A

Code Bases Relevant to Result 312A pom.xml – A dependency graph.

JacksonExample.Java – A microservice for serializing and deserializing Objects.

Issues Relevant to Result 310A

11942 – Build Failure for Framework.

12840 – Build Failure for Microservice.

Combined Result 306A

As described in resolutions for bugs 11942 and 12840, a build failure due to dependency conflicts may be resolved by removing conflicting transitive dependencies.

For step-by-step instructions on how to remove conflicting transitive dependencies, please see one of the issue records listed above.

How do I resolve a build failure due to dependency conflicts? 308A

| Automated Monitoring 422 |
|---|

↓

| Anomaly Detection 416 |
|---|

Triggers alert

↓

| User |
|---|

Submits query

↓

| System |
|---|

Retrieves relevant data

Presents Ranked Resolutions

↓

| Ranking Resolutions 412 |
|---|

Applies RankNet model

↓

| Ranked Resolutions |
|---|

| Developer |
|---|

Submits code change

↓

| System |
|---|

Retrieves insights

↓

| Smart Code Review 414 |
|---|

Provides code quality assessments

Retrieves relevant data

ANSWERING A QUERY ABOUT SOURCE CODE BY AUGMENTING THE QUERY WITH INFORMATION RETRIEVED USING CODE METADATA SIMILAR TO THE QUERY

BACKGROUND

Cloud computing systems and other computing systems are becoming increasingly ubiquitous in modern information technology (IT) infrastructure, as they may provide improved scalability, flexibility, and cost-effectiveness. For example, some organizations are migrating their applications from on-site servers to one or more cloud providers. As such, some cloud providers and/or other computing systems may need to support Continuous Integration and Continuous Deployment (CICD) pipeline(s) (e.g., centrally managed) that meet the requirements of diverse customer applications.

CICD pipeline(s) may be managed by software that promotes efficient software building, testing, and deployment by providing a status of software builds and information about personnel associated with software builds, tests, and deployment. The software development lifecycle may be managed to reduce or address software bugs before software advances to deployment or even after software has been deployed. As software progresses through phases, personnel involved in the software development lifecycle may act on tasks that have been raised by other personnel.

In a variety of bug or error triaging systems, errors are handled as reported by users as a result of testing and/or using the software. The reported errors may be handled by support personnel who may interact with development personnel as needed on an error-by-error basis. Existing reported errors are closed when resolved, and new errors may be reported for handling by personnel that are assigned to the new errors. The process of error triaging is cumbersome and may result in additional errors introduced during error handling.

BRIEF SUMMARY

In various embodiments, systems, methods, and computer-readable media are provided for intelligent code integration, deployment, and analysis. An example intelligent code analysis system is configured to access and maintain an issue knowledge base storing information about code issues and/or issue resolutions associated with one or more software pipelines managed by the system. The system may process a natural language request about one or more code issues, issue resolutions, and/or sets of code. The system may additionally or alternatively analyze code issues to determine sets of code that should be newly associated with the issues, and/or analyze sets of code to determine issues that should be newly associated with the sets of code. The system generates a prompt that includes content from the natural language request, information about code issues, and/or information about sets of code. The system prompts a large language model (LLM) with the prompt and provides a response for the natural language request based on a result of execution of the prompt by the LLM.

An example method is described that includes accessing, in a code inquiry session, a request comprising natural language content requesting information about code. The method also includes generating a request vector embedding representing the request based at least in part on the natural language content. The method also includes accessing content vector embeddings representing a plurality of items of code-related content that provide information about a plurality of sets of code. The method also includes determining a plurality of distances between the content vector embeddings and the request vector embedding. The method also includes selecting, to support communication with a large language model, a subset of the plurality of items of code-related content that provide information about at least one set of code based at least in part on the plurality of distances. The method also includes generating a prompt for execution at least in part by the large language model. The prompt includes at least some of the natural language content requesting information about code. The prompt also includes at least some information from each item of code-related content in the subset of the plurality of items of code-related content, including particular information about a particular item of code-related content. The method also includes prompting the large language model with the prompt. The method also includes accessing a result based at least in part on the execution. The method also includes storing, in association with the code inquiry session, a response to the request that identifies one or more issues and one or more sets of code based at least in part on the result. The particular item of code-related content is about the one or more issues or the one or more sets of code.

Another example method is described that includes generating a particular vector embedding representing a set of content describing functionality of a set of code. The method also includes generating issue vector embeddings representing a plurality of issues based at least in part on sets of natural language describing information about the plurality of issues. The method also includes determining a plurality of distances between the plurality of issue vector embeddings and the particular vector embedding. The method also includes selecting, to support communication with a large language model, a subset of the plurality of issues based at least in part on the plurality of distances. The method also includes generating a prompt for execution at least in part by the large language model. The prompt includes at least some natural language describing each issue of the subset of the plurality of issues. The prompt also includes at least some content of the set of content. The method also includes prompting the large language model with the prompt. The method also includes accessing a result based at least in part on the execution. The method also includes storing a new association between a particular issue and the set of code based at least in part on the result. The method also includes causing display of information identifying the particular issue as a candidate issue for the set of code based at least in part on the new association.

Another example method is described that includes generating a plurality of vector embeddings representing a plurality of sets of content describing functionality of a plurality of sets of code. The method also includes accessing natural language describing an issue detected in a set of code. The method also includes generating an issue vector embedding representing the issue based at least in part on the natural language. The method also includes determining a plurality of distances between the plurality of vector embeddings and the issue vector embedding. The method also includes selecting, to support communication with a large language model, a subset of the plurality of sets of content describing functionality of a subset of the plurality of sets of code based at least in part on the plurality of distances.

The method also includes generating a prompt for execution at least in part by the large language model. The prompt may include at least some natural language describing the issue. The prompt may also include at least some content from each set of content in the subset of the plurality of sets of content. The method further includes prompting the large language model with the prompt. The method further includes accessing a result based at least in part on the execution, and storing a new association between a particular set of code and the issue based at least in part on the result.

In some embodiments, a system is provided that includes one or more data processors and a non-transitory computer-readable storage medium containing instructions which, when executed on the one or more data processors, cause the one or more data processors to perform part or all of one or more methods disclosed herein.

In other embodiments, a computer-program product is provided that is tangibly embodied in a non-transitory machine-readable storage medium and that includes instructions configured to cause one or more data processors to perform part or all of one or more methods disclosed herein.

Cloud services, microservices, or other machine-hosted services may be offered that perform part or all of one or more methods disclosed herein. The machine-hosted services may be provided by a single machine, by a cluster of machines, or otherwise distributed across machines. The one or more machines may be configured to send and receive data, which may include instructions for performing the methods or results of performing the methods, via an application programming interface (API) or any other communication protocol.

In various embodiments, part or all of one or more methods disclosed herein may be performed by stored instructions such as a software application, computer program, or other software package installed in memory or other storage of a computing platform, such as an operating system, which provides access to physical or virtual computing resources. The operating system may provide access to physical or virtual resources of a mobile computing device, a laptop computing device, a desktop computing device, a server computing device, a container in a virtual machine on a computing device, or any other computing environment configured to execute stored instructions.

As used herein, the terms "first," "second," "third," "fourth," etc. are used as naming conventions to refer to separate items in a set of items. These naming conventions do not imply ordering unless such ordering is explicitly noted using language specific to ordering, such as "before" or "after," or unless such ordering is required to attain expressly recited functionality, such as generating an item and later accessing the generated item.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure.

FIG. 1A illustrates a flow chart of an example process that analyzes code and/or code issues in response to a query.

FIG. 1B illustrates a flow chart of an example process that supports integration and/or deployment of code accounting for known code issues.

FIG. 1C illustrates a flow chart of an example process that analyzes code issues to find relevant code bases.

FIG. 3A illustrates a diagram of an example user interface showing an input region for querying about code and/or code issues.

DETAILED DESCRIPTION

Figure 2A:
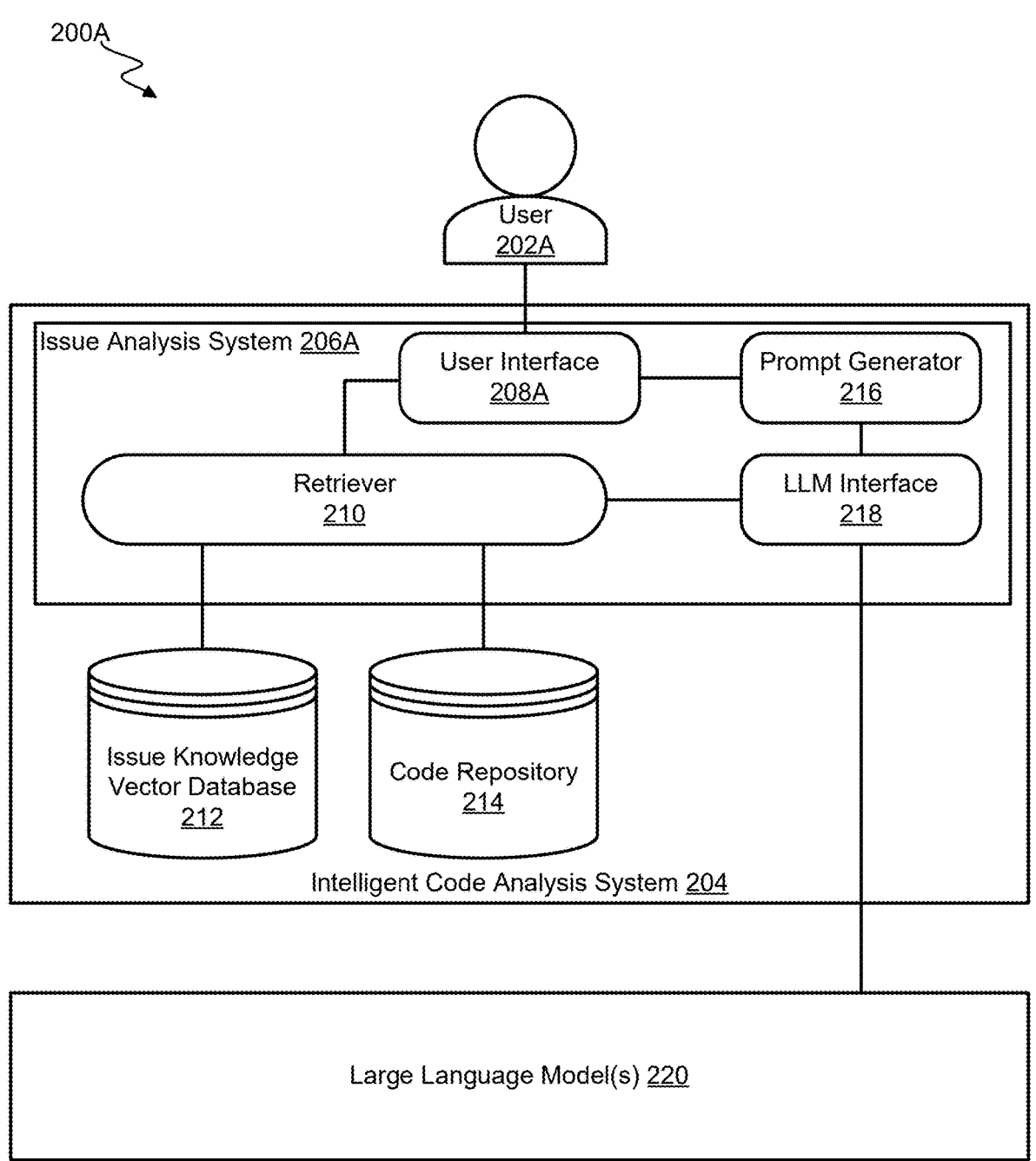
FIG. 2A illustrates a system diagram showing an example issue analysis system that analyzes code and/or code issues in response to a query.

Systems and methods for intelligent code integration, deployment, and analysis are described. In various embodiments, the techniques for integrating, deploying, and/or analyzing code or code issues may be implemented using non-transitory computer-readable storage media to store instructions which, when executed by one or more processors of a computer system, cause display of a user interface and processing of received input to integrate, deploy, and/or analyze code or code issues. The techniques for integrating, deploying, and/or analyzing code or code issues may be implemented on a local or cloud-based computer system that includes processors and a display for showing the user interface to a user or team(s) of user(s) for integrating, deploying, and/or analyzing code or code issues. The computer system may communicate with client computer systems for integrating, deploying, and/or analyzing code or code issues.

A description of integrating, deploying, and/or analyzing code or code issues is provided in the following sections:

CODE INTEGRATION, DEPLOYMENT, AND ANALYSIS
MANAGING AN ISSUE KNOWLEDGE BASE
MANAGING CODE AND CODE METADATA
DATA ANALYSIS USING LLMS
RETRIEVING INFORMATION TO SUPPORT LLM DATA ANALYSIS
GENERATING LLM PROMPTS USING RETRIEVED INFORMATION
USING A KNOWLEDGE BASE TO ANSWER NATURAL LANGUAGE QUERIES ABOUT CODE
USING RELEVANT INFORMATION FROM A KNOWLEDGE BASE TO DETECT ISSUES RELEVANT TO CODE FUNCTIONALITY.
USING RELEVANT INFORMATION ABOUT CODE FUNCTIONALITY TO PROACTIVELY DETECT SETS OF CODE RELEVANT TO KNOWN ISSUES
INTELLIGENT CODE ISSUE ANALYSIS, NOTIFICATION, AND RESOLUTION
COMPUTER SYSTEM ARCHITECTURE

The steps described in individual sections may be started or completed in any order that supplies the information used as the steps are carried out. The functionality in separate sections may be started or completed in any order that supplies the information used as the functionality is carried out. Any step or item of functionality may be performed by a personal computer system, a cloud computer system, a local computer system, a remote computer system, a single computer system, a distributed computer system, or any other computer system that provides the processing, storage and connectivity resources used to carry out the step or item of functionality.

Code Integration, Deployment, and Analysis

Software development, integration, and deployment may involve a series of pipelines and/or workflows. For example, a software developer may write code and submit the code for review and integration into a package, a cloud application, or with other components of a robust enterprise-grade application, integration, recipe, etc. The code may be built in a headless mode (e.g., independent of user interactions with the development or coding tool used to develop the code, and/or on a back-end or otherwise separately from a user interface of an application for contributing to code changes) or in any other build mode. Software tests may be run to scan the built code prior to or after the code is packaged. Once packaged, the code may be deployed into an environment (e.g., a monolith application, WebLogic service, application service, microservice, Kubernetes cluster, cloud service, business intelligence service, customer defined integration, etc.). In some frameworks, such as Continuous Integration and Continuous Deployment (CICD) pipelines for example, this process of code integration and deployment may be performed continuously to integrate and deploy new application features efficiently with back-end processes being performed to streamline or validate steps are taken accurately at each step of integration and/or deployment.

Users of a deployed software application or application in testing may identify issues associated with the code. For example, during testing or deployment, problems may be encountered which are reported by the users for eventual analysis and review. Additionally or alternatively, a CICD pipeline may run a series of tests to determine whether a deployment or proposed deployment is running successfully. The software development team may analyze flagged issues/test results and then submit new code or code updates to address the flagged issues/test results accordingly.

In some scenarios, various processes in a CICD pipeline may be performed in isolation. For example, the entity managing software deployment may not have a central platform that guides users and/or developers of the CICD pipeline by leveraging knowledge gained during execution of the CICD pipeline, other deployed instances of the CICD pipeline, and/or other related pipelines. In this example, knowledge gained from execution of certain steps in a CICD pipeline, such as detections of successes and failures, reasons of a failure, resolutions used to address similar failures, history of previous or other deployments of a certain pipeline, etc., may not be carried over or provided to users or developers (e.g., before or during or after a code package is deployed).

In another scenario, various embodiments of which are described herein, a code integration and deployment platform (e.g., CICD or other framework) may learn from historic information to be able to identify relevant contexts and/or scenarios associated with a particular project or pipeline and to provide useful information proactively (e.g., resolution recommendations, anticipated issues, etc.). For example, a system herein may identify a certain pattern that leads to a failure if the CICD pipeline executes a particular set of code or a similar code. Thus, the system may proactively or timely notify a software developer (e.g., prior to or after deployment) that a certain issue may occur when this code is deployed (or has occurred in a previous deployment of similar code). The system may also recommend a potential resolution, for example, by analyzing similar issues previously detected and/or resolutions previously applied to address the similar issues. For instance, during testing or while scanning a code submission, a failure pattern may be proactively detected by analyzing other similar code that was previously tested and/or deployed. In this example, the system may notify the software developer that the system has detected a similar pattern (e.g., in other tests or deployments) which resulted in a failure. Alternatively or additionally, the system may highlight potential issues during the scanning process or while the developer is entering the code (e.g., prior to deployment, after code submission, as part of or synchronously with code submission, or even before code submission) by identifying similar code associated with issues previously or recently detected. The system may also suggest potential solutions (e.g., based on solutions that were used to address other similar failures) for the potential issues.

In various examples, software development may be improved in dynamic and fast-paced environments by processes that are working behind-the-scenes to find similar issues for code being developed, similar code for issues being detected, or code or issues relevant to questions being asked. By way of example, in a cloud native application development environment (e.g., Kubernetes), the software development team may use a CICD pipeline to continuously integrate and deploy features in the cloud application. In this example, various developers may set strict security constraints for other software components interfacing with their respective code. In this scenario, certain interoperability issues, code severity, vulnerabilities, etc., may arise or may be required by the various components of the integrated application. These issues may be difficult to identify without knowledge of issues and/or constraints introduced (e.g., by other developers or documentation) during the continuous integration and deployment process. In various embodiments, efficiency of software development in such an environment may be improved by proactively identifying issues and potential resolutions automatically. In one example, the system continuously learns from issues or patterns observed or recorded to bring an insight to developers during their development process about issues that could potentially cause a problem when their code is merged with the rest of the application or project.

In another example, for any pipeline where the developer prepares code and then submits it for deployment, code issues can be predicted based on similar code submissions by another developer or at an earlier time. Thus, more generally, the steps of code development, integration, deployment, and code quality management can be improved in the pipeline by using the knowledge base to predict or anticipate potential code issues even issues that have not been detected in the past. For example, the system can leverage technology advancements such as generative artificial intelligence (Gen AI), Retrieval Augmented Generation (RAG), large language models (LLM), and other machine learning techniques to anticipate issues based on patterns associated with other code submissions learned by the system.

In some aspects, systems and methods are provided for resolution ranking. For example, if more than one possible resolution is identified for a certain issue, a system may determine a ranking for the various potential resolutions based on information collected (e.g., success metrics, failure metrics, etc.) when these potential resolutions were applied to address other similar issues. Various ranking algorithms (e.g. RankNet Model, etc.) can be used to rank the potential resolutions.

An example system as described herein may prompt a LLM or other natural language processor or machine learning model to analyze an issue knowledge base to proactively identify issues, issue resolutions, and/or other pipelines or integrations that might be affected by an issue, etc. For example, the system may analyze the knowledge base to identify known or new problems which might affect one or more pipelines, e.g., whether or not those pipelines are deployed and/or whether the pipelines require modification or remediation prior to deployment. Alternatively or additionally, the system may analyze the knowledge base to identify potential issues in a particular code (e.g., during review, during testing, prior to integration, prior to deployment, etc.).

Managing an Issue Knowledge Base

Example systems herein may maintain and analyze a knowledge base to gain insights from previous code submissions, collected metrics, failure detections, issue resolutions, etc. To that end, the knowledge base may include various types of information about code issues, issue resolutions, code metadata, test results, monitored metrics, and/or associations between these various types of information. The system may collect, store, and/or learn the information in the knowledge base over time as various pipelines and sets of code are integrated and deployed. In some examples, information stored in the knowledge base may be tokenized or summarized or generalized or anonymized, e.g., for privacy or security. For example, the system may store a quality metric, an analysis result, or other information describing code functionality (e.g., microservice, try-catch block functionality, cyclomatic complexity, language and framework composition, dependencies, etc.) in the knowledge base instead of (or in addition to) storing the actual code. Such information may be generated by developers and/or reviewers in the form of comments or other metadata, or by a large language model description of code snippets in the form of metadata about the code snippets.

In an example, the knowledge base may include a bug database (e.g., enterprise application bug database, product release notes, etc.), a vector database, and/or any other database storing information about bugs, results, metrics, etc., associated with certain pipelines and/or sets of code. The information about the bugs may be reported by, e.g., users, anomaly detection algorithms, test algorithms, metric monitoring algorithms, developers, etc. For example, a user may submit a bug report that indicates that providing a certain input to an application programming interface (API) returned an unexpected or incorrect output. The system, in this example, may store other relevant information (e.g., functionality or code triggered by user(s) prior to the bug report, code review note(s) submitted by developer(s) reviewing the bug report, resolution or code update(s) submitted by developer(s) to fix the bug, etc.) in the knowledge base.

The system may store, in the knowledge base, information about specific issues relevant to a set of code, resolutions (e.g., code updates) used to resolve these issues, relevant code features or metadata (e.g., calls to other libraries, missing conditions, memory leaks, security violations, repository structural metadata, code quality metrics, performance and/or operational metadata, etc.), and/or any other information associated with the issues and/or the set of code (e.g., code review comments, keywords, test results, etc.).

Below is an example of how information about an error can be stored in the knowledge base (e.g., database) that can be used for Retrieval Augmented Generation (RAG) and/or LLM training. In this example, the knowledge base may include a vector database where each record 'Xi' in the database corresponds to an error or issue.

$$Xi = \left[1, 0, 0, 1622657643,\right.$$

$$\text{"Build failed due to dependency issue.", "Update dependencies."}\right]$$

$$Xi = \left[100A1622657643,\right.$$

$$\text{"Build failed due to dependency issue.", "Update dependencies."}\right]$$

Two different example formats for Xi are presented above for convenience. Xi may include one or more binary indicators. In this example, the first binary value ('1') may indicate a failure type (e.g., value of '1' indicates build failure). Similarly, in this example, the next two binary values ('0, 0') may specify other failure types. Xi may also include one or more numeric values (e.g., integers, etc.) that indicate other types of information such as a time stamp (e.g., '1622657643') corresponding to a time when the error Xi was detected. In this example, the next field in Xi (e.g., "Build failed due to dependency issue.") includes a description of the error detected. The last field of Xi in this example includes a description of a potential resolution (e.g., "Update dependencies.").

Other formats for storing information about errors, resolutions, and/or code sets in the knowledge base are possible. For example, Xi may indicate additional attributes of the error, the code (e.g., language, complexity, etc.) associated with an error, the resolution (e.g., success, failure, etc.), other statistics, and/or other attributes. Therefore, the format of Xi presented above is not meant to be limiting but is described as noted above only for the sake of example.

Managing Code and Code Metadata

To facilitate intelligent issue and resolution identification, the system may keep track of code functionality of the various sets of code used in various pipelines. For example, when new code is submitted or code is otherwise updated, the system may determine code metadata such as code comments, review notes, summaries (manually or automatically generated), repository structural metadata, code quality metrics, performance metrics, and/or operation metrics. The system may encode and/or store the various types of code metadata in association with various records of errors in the vector database or issue knowledge base. In this way, when an issue is detected in a particular set of code (e.g., new code submission, set of code deployed in a pipeline, etc.), other sets of code that may encounter the same issue can be identified using the code metadata. Similarly, when an issue is identified (or a resolution is applied successfully), other sets of code (e.g., new code submission) that may have the same issue can be quickly identified by matching the code metadata of the set of code associated with the issue to the code metadata of the other sets of code. In some examples, the code metadata can be stored in a knowledge base (e.g., vector database). In other examples, the code metadata in association with a knowledge base (e.g., a vector database storing information about errors and attributes of code associated with the errors).

Example repository structural metadata includes metadata that indicates language and/or framework composition (e.g., 60% Python, 30% TypeScript, 10% Shell scripts, etc.) of a set of code, metadata that indicates a dependency graph and/or library versions of libraries called by a set of code, and/or metadata that indicates architectural patterns (e.g., microservices, monolithic, serverless) associated with a set of code. Example code quality metrics associated with a set of code may include cyclomatic complexity scores, code coverage percentages, and/or static analysis tool findings (e.g., potential security vulnerabilities, code smells, etc.). Example performance and/or operational metadata associated with a set of code may include average response times for critical functions, resource utilization patterns, deployment frequency and/or release cycle information.

In some examples, the system is configured to determine or generate code metadata based on comments embedded with a set of code (e.g., text description entered by the developer as a comment in the source code file), review notes or comments submitted by a code reviewer, and/or other information associated with a set of code. This textual information or a summarized/processed version thereof can be used to identify or describe the set of code and/or attributes thereof without necessarily incorporating the actual code in code metadata.

In some examples, the system may determine or generate code metadata for a set of code by executing a natural language processing (NLP) algorithm or any algorithm. For example, the system may execute sentiment analysis algorithms to analyze code review comments that determine an overall sentiment (e.g., positive, negative, neutral) expressed in the code review comments. As another example, the system may execute semantic similarity algorithms that compare resolution descriptions in the issue knowledge database with code review feedback to determine valuable context for code quality assessment. The results of the semantic similarity assessment and/or the sentiment analysis can be normalized, encoded, tokenized, and/or otherwise processed to generate code metadata for the set of code. As another example, a more generalized model such as a model built into a vector database or a Word2Vec model may be used to create vector embeddings based on a set of comments or other natural language associated with a set of code.

In some examples, the system is configured to store (e.g., in a vector database) an indication of code logic or code functionality associated with a code issue (e.g., "Build failed due to dependency issue."). Based on this information from the knowledge base, the system may identify a potential issue in another set of code. For example, during code review, the system may determine code metadata for a new code submission that indicates a same or similar dependency as that identified in the issue knowledge base. For example, the system can determine a semantic similarity between code metadata of the new code submission and other sets of code. As another example, the system may prompt an LLM using information from the knowledge base (e.g., resolution description, code review comments, etc.) to identify dependency issues and inform the software developer that this new code submission may encounter a dependency issue. For instance, the LLM response may indicate that a similar dependency is in the error descriptions of other errors associated with other sets of code. Thus, in various embodiments, code metadata indicating code functionality or code logic (e.g., of a code snippet) may be implicitly indicated (e.g., in error descriptions, etc.) in an issue knowledge base, or explicitly indicated either within the knowledge base (e.g., as additional fields) or separately (e.g., in a separate or local code metadata repository).

Thus, in some examples, the LLM does not necessarily need to be trained using the actual code to be able to predict code issues and/or resolutions. For example, code metadata can be compared against error descriptions or other information implicitly indicated in the knowledge base and/or in the training data of the LLM without sharing actual lines of code with the LLM or the issue knowledge base. Furthermore, code metadata associated with other sets of code can be used to narrow the scope of an LLM query to focus on the most relevant issues, resolutions, and/or code sets. Thus, for instance, in implementations where code privacy is a requirement (e.g., where customers prefer preventing their actual source code from being shared with an LLM provider and/or from being stored in the issue knowledge base), code metadata can be generated to describe key features or attributes of the code (e.g., complexity, language, review comments) and/or tokenized versions of code information for sharing in the knowledge base or in the LLM training data instead of sharing the actual code. In one embodiment, an LLM is used to generate a summary of a code snippet, and the summary is tokenized for inclusion as code metadata.

In alternative examples, the LLM can be trained using actual code and/or the knowledge base can be updated to include portions of code associated with a code issue or code error. For example, in configurations where code privacy is not essential (e.g., open source code, etc.), the system can include sets of code or portions thereof into the training data of the LLM and/or in the records stored in the issue knowledge vector database to further improve the issue identification and/or resolution recommendation aspects of the present disclosure.

Non-limiting exemplary sets of code and associated code metadata are presented below for the purposes of illustration.

Example 1

```
pom.xml
-----------

<project xmlns="http://maven.apache.org/POM/4.0.0"
xmlns:xsi="http://www.w3.org/2001/XMLSchema-instance"
      xsi:schemaLocation="http://maven.apache.org/POM/4.0.0
http://maven.apache.org/xsd/maven-4.0.0.xsd">
<modelVersion>4.0.0</modelVersion>
    <groupId>com.example</groupId>
    <artifactId>dependency-microservice</artifactId>
    <version>1.0-SNAPSHOT</version>
    <dependencies>
        <!-- Spring Boot Dependencies -- >
        <dependency>
            <groupId>org.springframework.boot</groupId>
            <artifactId>spring-boot-starter-web</artifactId>
        </dependency>
        <!-- Jackson for JSON serialization -- >
        <dependency>
            <groupId>com.fasterxml.jackson.core</groupId>
            <artifactId>jackson-databind</artifactId>
        </dependency>
    </dependencies>
</project>
JacksonExample.Java
------------------- package com.xx.microservice.component.example
/**
* This is a microservice example of how the jackson library is used
*/
public class JacksonExample {
    /**
    * The method provide an example of object being serialized and deserialized.
    *
    */
    //TODO: Need to pass an argument which would determine if it needs to be
serialized or deserialized
    public void SerializeDeserialize( ) {
        // Create an instance of ObjectMapper
        ObjectMapper objectMapper = new ObjectMapper( );
        // Example 1: Serialize a Java object to JSON
        Person person = new Person("John Doe", 30);
        try {
            String json = objectMapper.writeValueAsString(person);
            System.out.println("Serialized JSON: " + json);
        } catch (Exception e) {
            e.printStackTrace( );
        }
        // Example 2: Deserialize JSON back into a Java object
        String jsonInput = "{\"name\":\"Jane Doe\",\"age\":25}";
        try {
            Person deserializedPerson = objectMapper.readValue(jsonInput,
Person.class);
            System.out.println("Deserialized Object: " + deserializedPerson);
        } catch (Exception e) {
            e.printStackTrace( );
        }
    }
}
```

An example system may analyze the above-referenced code (labeled 'Example 1') to determine the various types of code metadata described above. For repository structural metadata, the system may determine metadata indicating that: the language/framework composition is 'Java', a library was added as a dependency (and optionally how that library is being used in the code), and an architectural pattern (e.g., microservice) determined based on the package and the comments in the text of the code.

For code quality metrics, the system may determine a cyclomatic complexity (CC) of the code, code coverage percentage (e.g., "No code coverage found") of the code, and/or static analysis tool findings (e.g., "Exception Handling—The catch blocks only call e.printStackTrace( )").

The CC of the code (e.g., '5') may be computed by analyzing the code and solving the equations below:

$$\text{Decision Points } = 2(\text{try} - \text{catch blocks})^* 2 \text{ paths} = 4$$

$$CC = \text{Number of Decision Points} + 1(\text{default path}) = 4 + 1 = 5$$

For performance and operations metadata, the system may determine metadata such as average response times for critical functions (e.g., 10 ms), resource utilization pattern (e.g., 'low'), deployment frequency and release cycle information (e.g., '2 weeks').

The system may also generate metadata based on comments embedded with the code (e.g., "The method provide an example of object being serialized and deserialized", "TODO: Need to pass an argument which would determine if it needs to be serialized or deserialized", etc.). For example, the system may extract keywords like "TODO" as an indication that the code may have incomplete functionality, etc.

Example 2

```
config.json
----------
{
    "compilerOptions": {
        "target": "ES6",
        "module": "commonjs",
        "strict": true,
        "esModuleInterop": true,
        "outDir": "./dist"
    }
}
index.ts
----------
//This is a typescript example where it depends on lodash
    library. The typescript helps
//to get the unique values
//Import the lodash library
import_from 'lodash';
//A simple function using lodash to find unique values in
    an array
function getUnique Values (arr: number [ ]): number [ ] {
    return_.uniq(arr);
}
//Example usage of the function
const numbers=[1, 2, 2, 3, 4, 4, 5];
console.log('Unique Values:', getUniqueValues (num-
    bers));
index.test.ts
----------
//src/index.test.ts import {getUniqueValues} from './in-
    dex'; test ('should return unique values from an array',
    ( )=>{const numbers=[1, 2, 2, 3, 4, 4, 5];
expect(getUniqueValues (numbers)).toEqual([1, 2, 3, 4,
    5]);});
```

An example system may analyze the above-referenced code (labeled 'Example 2') to determine the various types of code metadata described above. For repository structural metadata, the system may determine metadata indicating that: the language/framework composition is 'Typescript', and the 'lodash' dependency (and optionally how that library is being used in the code).

For code quality metrics, the system may determine that a CC of this Typescript code is '2', a code coverage percentage (e.g., "Code coverage provided in index.test.ts"), and/or static analysis tool findings (e.g., "For production code, consider using a proper logging library or removing console.log( ) statements to avoid exposing sensitive data."). The system may also incorporate other code review comments as metadata (e.g., automatically generated comments such as "The CC of 2 indicates that the code has a very simple control flow with only one independent path through the program. This is expected for straightforward code that doesn't contain decision points or complex branching logic").

For performance and operations metadata, the system may determine metadata such as average response times for critical functions (e.g., 50 ms), resource utilization pattern (e.g., 'low'), deployment frequency and release cycle information (e.g., '4 weeks').

Example 3

```
#Requests.py
#This code uses the request object to check the status of
    the request and return #appropriate status code.
#Import the requests library
import requests
#Function to fetch data from an API
def fetch_data (url):
    response=requests.get (url)
    if response.status_code==200:
        return response.json( ) #Parse JSON response
    else:
        return f"Error: {response.status_code}"
#Example usage
if_name__=="_main_":
    url='https://jsonplaceholder.typicode.com/posts/1'
    data=fetch_data(url)
    print(data)
#Code Coverage
#------------------
#test_script.py
import unittest
from script import fetch_data #Assume the original script
    is named 'script.py'
class TestFetchData (unittest.TestCase):
    def test_fetch_data_success(self):
        url='https://jsonplaceholder.typicode.com/posts/1'
        result=fetch_data (url)
        self.assertIn ('userId', result)
        self.assertIn ('title', result)
    def test_fetch_data_error (self):
        url='https://jsonplaceholder.typicode.com/invalid'
        result=fetch_data (url)
        self.assertTrue (result.startswith ("Error:"))
    if _name_=='_main_':
        unittest.main( )
```

An example system may analyze the above-referenced code (labeled 'Example 3') to determine the various types of code metadata described above. For repository structural metadata, the system may determine metadata indicating that: the language/framework composition is 'Python', a dependency to a request object detected (e.g., code gets the request object and returns a response status code).

For code quality metrics, the system may determine that a CC of this code is '2', a code coverage percentage (e.g., "Code coverage provided under 'Code Coverage' section of code"), and/or static analysis tool findings (e.g., "Network call: The requests.get call is a potential source of errors, such as network issues or timeouts. Adding a timeout parameter (e.g., requests.get (url, timeout=5)) would make it more robust."). The system may also incorporate other code review comments as metadata (e.g., automatically generated comments such as "The CC of this code is 2, which indicates that it is simple and not very complex. This level of complexity means that the code is easy to test, understand, and maintain.").

For performance and operations metadata, the system may determine metadata such as average response times for critical functions (e.g., 10 ms), resource utilization pattern (e.g., 'low'), deployment frequency and release cycle information (e.g., '4 weeks').

Data Analysis Using LLMS

In line with the discussion above, an example system may train a large language model (LLM) with information about errors or code issues detected when running one or more pipelines, resolutions applied to overcome these issues or errors, and so on. The LLM can then be used to predict other issues associated with other sets of code. For example, the system can prompt the LLM to identify potential issues and/or issue resolutions at various stages of a pipeline such as during code review, in response to a user query, in response to an anomaly detection, and/or proactively while one or more pipelines are running.

In one example, a configuration command may be provided to a query processing service in a user session or connection with a client to select a particular large language model for use with the natural language of incoming queries on a user session, or for given requests, from the client. For example, the "openai" large language model provider may be chosen with named credentials. The model used may be, for example, gpt-3.5-turbo. Other example providers include, but are not limited to, Cohere, Azure AI, Google PaLM 2, Llama 3, etc. In various other examples, default credentials may be used by the query processing service. In one embodiment, the credentials include user-specific credentials, such as a user-specific inner session identifier, that allow the LLM service to switch between supporting different users within the same LLM session using the same LLM connection credentials. In this embodiment, context from a given user may be retrieved using the user-specific inner session identifier before processing a natural language query for the given user. In another embodiment, an application uses the same LLM service for users but may use different LLM sessions for different users. The LLM session may be authenticated using a token that is established to refer to a particular user session. The token may be passed by the application to establish or re-establish the authenticated session with the LLM and begin sending prompts.

In various embodiments, prompts are generated to use information about a data schema of multidimensional data available in a user session with an application. The data schema may include dimension names (e.g., Scenario, Market, Year, Product, and Measures), member names, and drill-down and roll-up hierarchies that are available to view or manipulate in the user session. The data schema may be formatted in a hierarchical format, such as JSON, XML, or another structured and delimited format that distinguishes between members at different levels of the hierarchy.

The prompts may also specify a format for providing the reply, through example valid responses to example requests, and/or through explicit description of the requested format.

In various embodiments, the techniques herein refer to "a prompt" being generated, and "the prompt" is intended to refer to a single request or multiple requests that, together, serve to prompt the LLM. LLMs may be prompted in a same session using one or multiple requests as the prompt to perform functionality, and the delineation between requests to the LLM can be split in any manner in accordance with the techniques described herein.

In one embodiment, validating the content of the LLM reply includes verifying that the reply conforms to the correct length and data type constraints, if any. If the LLM reply includes a data structure consumable by the application, the validation may include verifying that the data structure conforms to a schema or set of structured instructions exposed by the application through an API.

In various embodiments, the application may provide a configuration interface to the user for configuring a workflow for handling LLM replies that could not be validated. The configuration could specify that the LLM may be re-prompted with the non-validated reply used as a non-conforming example that should be avoided, or to trigger an error message.

In one embodiment, JSON results from the LLM are parsed by searching for delimiters such as "{" and "}" or "[" and "]" in the response. The values may be embedded in the delimiters and extracted from the embedded structure to determine values predicted by the LLM. The consumable JSON object may be separated from a remainder of the response for consumption by the application to create an executable structure to trigger application functionality.

Retrieving Information to Support LLM Data Analysis

In various embodiments, information stored in the issue knowledge base (e.g., vector database of issues, resolutions, etc.) as well as other information stored separately from an LLM (e.g., code metadata, sets of code, etc.) can be used to improve LLM data analysis by providing context and/or updated information in the form of an updated LLM prompt to improve LLM results. By way of example, when a user submits a natural language query inquiring about an unexpected behavior of a pipeline, the system can augment the user's query with contextual information specific to the pipeline (e.g., information from an issue knowledge base of the pipeline, code metadata of code associated with the user query, etc.) to improve LLM results. This process of augmenting LLM prompts using information from the issue knowledge base or other source of information may be referred to as retrieval augmented generation (RAG).

In some examples, an LLM can be trained (e.g., periodically or intermittently) using errors detected in different pipelines deployed on the system (e.g., previous historical pipeline runs). For example, the system can train a generic LLM for error detection and/or resolution determination that can be used with any pipeline. The system may alternatively or additionally store information associated with a specific pipeline in a knowledge base of the specific pipeline. Thus, the system can use retrieval augmented generation (RAG) to modify prompts to the LLM associated with the specific pipeline using the knowledge base of the specific pipeline. And the system can prompt the same (e.g., generic) LLM to find errors or resolutions for a different pipeline by using RAG to modify prompts to the LLM using the knowledge base of that different pipeline. Thus, using RAG can enable the system to improve the scalability, accuracy, and/or privacy of LLM data analysis by providing a customizable LLM prompting mechanism using information (i.e., knowledge bases) specific to each different pipeline, project, and/or customer.

In some examples, the system may identify a pattern match corresponding to an error before or after a pipeline is deployed. For example, before a pipeline is deployed, the system can use the LLM to identify an error based on the code base. After the pipeline is deployed, the system can identify a potential solution for an error based on the LLM and RAG (e.g., upon detection of the error). For example, the system can use the knowledge base to identify similar code which generated an error (e.g., before pipeline deployed) or use the knowledge base to identify a potential solution for an error (e.g., after pipeline is built).

In some examples, the system can use LLMs and RAG to determine insights about code issues and/or resolutions that would otherwise be difficult to obtain. For example, consider a pipeline that uses a combination of five different sets of code. Individually, these five sets of code may not be associated with a particular code issue. However, integrating the five components together in a particular pipeline (e.g., as a recipe) may result in new issues. By maintaining an issue knowledge base for that particular pipeline, issues associated with this particular combination of components can be flagged and differentiated from issues specific to one component. Thus, in scenarios where a customer has a unique recipe or pipeline, the system can maintain a unique history of the pipeline for the purposes of RAG (e.g., an issue knowledge base) to more effectively predict pipeline failures and/or more efficiently recommend resolutions. In contrast, some cloud native system may confuse errors associated with an individual component with issues that are specific to the integrated combination of components associated with a particular pipeline.

Relevant information may be identified for inclusion in a large language model prompt based on determining a similarity between code metadata and issue information, for example, using a common embedding technique across both the code metadata and the issue information. The common embedding technique may output vector embeddings for code issues as well as vector embeddings for code metadata, and a similarity of the vector embeddings may be determined using a variety of vector distance techniques to find code issue vector embeddings that are closest or within a threshold distance of code metadata vector embeddings.

Figure 4:
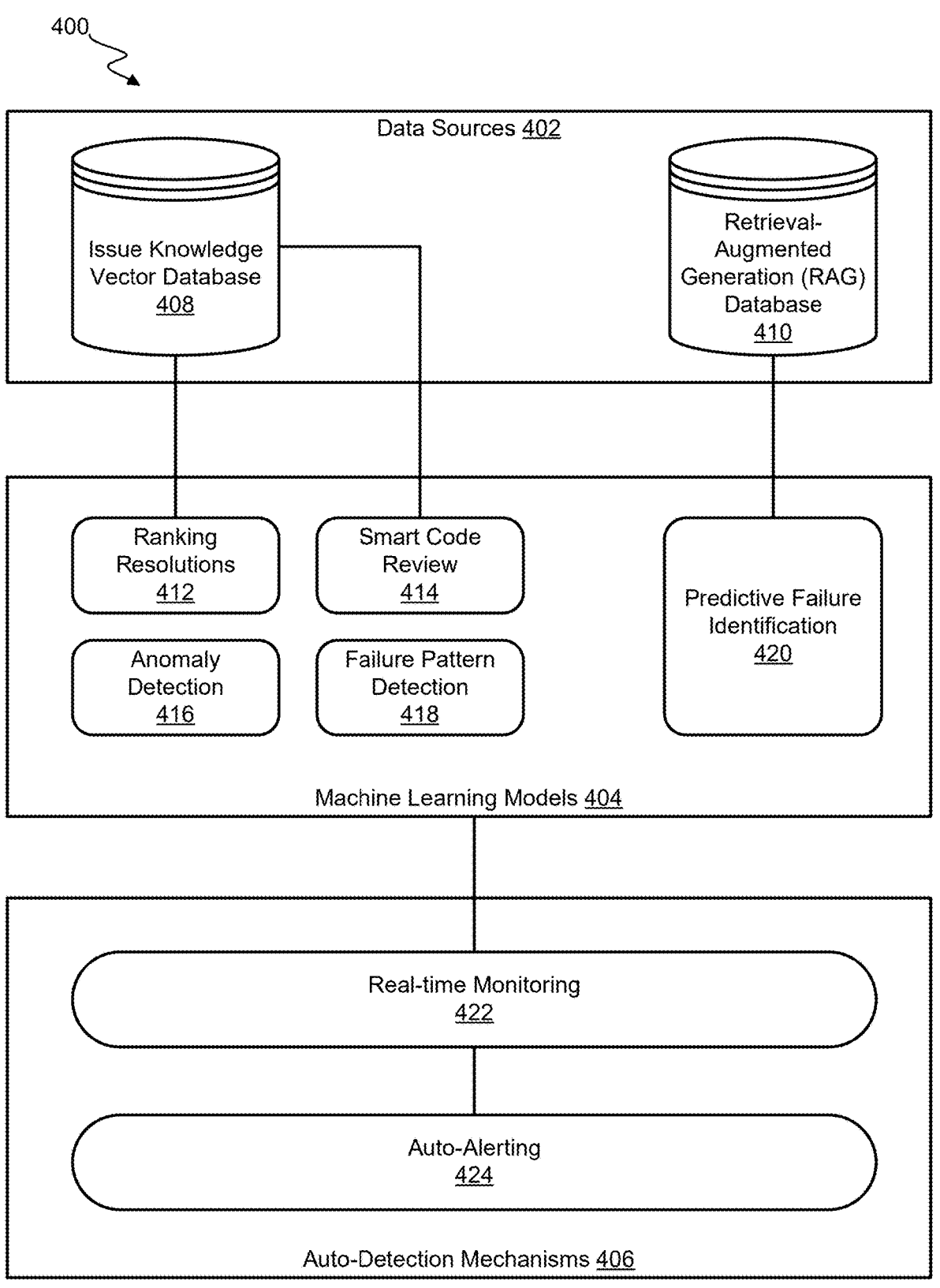
FIG. 4 illustrates a system diagram showing an example CICD pipeline management system.

FIG. 4 illustrates a system diagram showing an example CICD pipeline management system 400. The system 400 includes data sources 402, machine learning models 404, and auto-detection mechanisms 406. The data sources 402 may include an issue knowledge vector database 408 and a retrieval-augmented generation (RAG) database 410. The knowledge vector database 408 may store word embeddings of Knowledge base data representing CICD failures and associated resolutions. For example, each entry in the database 408 may include features such as failure components, types, timestamps, and resolution details. Other database schema are possible. In an example, data in the database 408 is collected from various sources within the CICD pipeline, including error logs, deployment records, and resolution notes. These data points are then processed and stored in the database. Before storing data in the database 408, in an example, categorical features are normalized and encoded to ensure consistency and compatibility with machine learning models 404.

The RAG database 410 may store historical failure patterns and resolutions for proactive failure identification. For example, data stored in the RAG database 410 can be used to augment data retrieval and generation using advanced large language models for contextual insights.

The RAG database 410 and/or other system components of the system 400 may include one or more algorithms for updating and using the RAG database 410. For example, the system 400 may include a retriever algorithm that utilizes similarity metrics or machine learning-based approaches (e.g., cosine similarity, neural retrieval models) to identify relevant historical data based on input queries or context. As an example mathematical formulation for the retriever algorithm, the retrieval process may involve calculating similarity scores between input queries and historical data, followed by ranking and selection of top-k relevant documents. The system 400 may also include a generator algorithm that utilizes advanced language models such as GPT (Generative Pre-trained Transformer) to generate contextualized responses or resolutions based on retrieved data and input prompts. As an example mathematical formulation for the generator algorithm, the generator model may be trained using large-scale text data and fine-tuned on specific tasks (e.g., failure resolution generation). For instance, the generator model may generate responses by sampling from the learned probability distribution over the vocabulary conditioned on input prompts and context.

Various database schema designs are possible for the issue knowledge vector database 408. By way of example, a database schema may be designed to accommodate various attributes related to CICD failures and resolutions, such as failure type (e.g., build failure, deployment failure), failure components (e.g., specific modules, services, or infrastructure components, security violations, and/or code metadata or other code identifier of code associated with the failure), timestamps of failure occurrences, description of the failure, and/or resolution details (if available). The schema may be optimized for efficient storage and retrieval of data to support quick access during issue resolution and analysis.

In one example, a mathematical model associated with the issue knowledge vector database primarily focuses on representing failure instances and resolutions as feature vectors for machine learning tasks. By way of example, a feature vector representation $(x_i)$ may be configured such that each entry $i$ in the database is represented as a feature vector $x_i$ that includes relevant attributes and features. For instance, $x_i=[x_{i1}, x_{i2}, \ldots, x_{in}]$ may represent the feature vector for entry $i$. In this example, $x_{ij}$ represents the $j$th feature of entry $i$. The features may include binary indicators (e.g., failure type), numerical values (e.g., timestamps), text embeddings (e.g., failure descriptions), etc.

The machine learning models 404 include one or more machine learning models configured to implement ranking resolutions module 412, smart code review module 414, anomaly detection module 416, failure pattern detection module 418, and predictive failure identification module 420.

The ranking resolutions module 412 includes one or more algorithms (e.g., RankNet algorithm) configured to determine ranks for issue resolutions stored in the issue knowledge vector database 408. In an example, the ranking resolutions 412 includes a RankNet algorithm implemented using a neural network architecture trained on historical data from the Issue Knowledge Vector Database 408. For example, the neural network learns to rank resolutions based on their contextual relevance and historical success rates. In this example, the RankNet loss function may be optimized during training to minimize the discrepancy between the predicted ranking order and the ground truth ranking provided by historical data. The model may be trained using a combination of positive and negative examples, where positive examples represent successful resolutions and negative examples represent unsuccessful resolutions. Training data is sampled from the Issue Knowledge Vector Database 408.

In one example, the ranking resolutions module 412 may utilize RankNet or LambdaRank for direct optimization of resolution ranking. An example mathematical equation representing the RankNet Loss function is presented below:

$$L_{RankNet} = -\sum i, \; jP_{ij}\log(\sigma(f(x_i) - f(x_j)))$$

For instance, the ranking resolution module 412 may train a neural network-based ranking model using historical data, where $f(x_i)$ represents the learned feature vector for resolution $i$ and $\sigma$ is the sigmoid function.

By optimizing resolution ranking using RankNet or LambdaRank algorithms, the system 400 may ensure or improve the likelihood that the most effective solutions are prioritized based on historical success rates and contextual relevance.

The smart code review module 414 includes one or more algorithms configured to facilitate code review processes. In an example, the smart code review module 414 includes a pipeline of natural language processing (NLP) techniques or processes executed and/or applied to code review feedback and resolution descriptions (e.g., stored in the knowledge vector database 408) to extract or generate insights into code quality. The smart code review module 414 may also include sentiment analysis algorithms configured to analyze text data to determine an overall sentiment (e.g., positive, negative, neutral) expressed in code review comments. The smart code review module 414 may also include keyword extraction techniques or algorithms configured to identify important terms and/or phrases in resolution descriptions and code review feedback, thereby providing valuable context for code quality assessment. The smart code review module 414 may also include semantic similarity algorithms configured to compare resolution descriptions and code review comments to identify similarities and differences, facilitating code review and resolution recommendation.

In one example, the smart code review module 414 may be configured to apply NLP for sentiment analysis, keyword extraction, and/or semantic similarity analysis. An example mathematical equation representing the sentiment analysis process is presented below:

$$\text{Sentiment Score} = \sum iwi \cdot freq(wi) \quad \text{Sentiment Score} = \sum iwi \cdot freq(wi)$$

In one example, the smart code review module 414 may utilize NLP algorithms to extract insights from resolution descriptions and code review feedback, thereby providing valuable feedback on code quality.

By integrating NLP techniques for sentiment analysis and keyword extraction, the system 400 enhances code review processes, thereby providing developers with actionable insights into code quality and facilitating effective collaboration.

The anomaly detection module 416 includes one or more algorithms configured to detect anomalies or failures during deployment of the CICD pipeline. For example, anomaly detection algorithms can be applied to monitored metrics to identify deviations from expected behavior. These algorithms may use statistical techniques or machine learning models to detect unusual patterns or outliers that may indicate potential issues or failures in the pipeline.

In one embodiment, vectors of similar distance may be determined for an input vector using a vector database. The vector database may receive, as input, a vector representing code metadata or a code issue, and the vector database may identify, using vector distances, another set of data, such as code issue data or code metadata, stored in the database that is closest to the input vector.

The data management system or vector database may determine similarities between vectors by calculating a similarity measure and optionally ranking pairs based on similarity or comparing the similarity measure to a threshold value. For numerical or vector data, the data management system may use any distance function or other method of determinations of numerical or vector similarities, such as Cosine Distance, the Euclidean Distance, the Pearson Correlation Coefficient, the Manhattan Distance, the Minkowski Distance, the Hamming Distance, the Chebyshev Distance, the Jaccard Distance, the Sorensen-Dice Distance, the Pearson correlation coefficient, the Levenshtein distance, or any other means of calculating correlation. For text data, the correlation may be determined by first converting the text to embeddings in vector space in a large language model, which can then be compared using any of the above methods for determining the similarity between vectors. The text embeddings may reduce semantic meanings within the text to numerical values corresponding to the detected semantic meanings. In this way, the correlation between columns is based on the meanings of the words of the text data.

The distance or similarity analysis may be performed on the whole vector embedding or by breaking up vectors into components to determine correlation of corresponding components across the vectors. For example, a first vector and a second vector may each include a component that indicates a method that includes a loop, and the information about the loop may be correlated across vectors even though the rest of the vector is not correlated. A correlation or similarity between vectors may be determined by comparing the correlation determined according to the similarity measure to a similarity threshold. The vectors may be counted as similar if the similarity measure exceeds the similarity threshold. In an alternative embodiment, the vectors may be compared to determine correlation clusters, where columns or components of the vectors or vectors themselves are determined to be part of a cluster if the correlation between all combinations of columns, components, or vectors in the cluster is above a certain threshold.

A Pearson Correlation Coefficient between two vectors is calculated as a ratio between the covariance between the vectors and the product of the standard deviations between the two vectors. A correlation coefficient of 1 represents identical vectors, a correlation coefficient of $-1$ represents opposite vectors, and a correlation coefficient of 0 represents vectors that are not correlated.

A Cosine Distance or cosine similarity between two vectors is determined by calculating a cosine of the angle between the two vectors. A result of 1 represents a cosine similarity between two identical, a result of $-1$ represents a cosine similarity between two opposite vectors, and a result of 0 represents a cosine similarity between two unrelated or orthogonal vectors.

A Euclidean Distance is determined by calculating a square root of a sum of the squares of the distances between components of the two vectors. The higher the Euclidean distance, the lower the similarity between the components of the vectors used in the calculation.

A Manhattan Distance is calculated as a sum of the absolute differences between components of the vectors. The higher the Manhattan Distance, the lower the similarity between the components of the vectors used in the calculation.

A Minkowski Distance is calculated as the p-th root of the sum of the absolute differences between components of the vectors raised to a power, p, for each component pair. The Minkowski Distance equals the Manhattan Distance when p=1 and the Euclidean Distance when p=2. The higher the Minkowski Distance, the lower the similarity between the components of the vectors used in the calculation.

A Hamming Distance between two vectors is determined based on how many positions at which corresponding components of the vectors are different or sufficiently different. For each component pair in the vectors that are different, a counter is incremented. The Hamming Distance is the total counter for the vectors across all component pairs.

A Chebyshev Distance between two vectors is calculated as the greatest of the absolute differences among the vectors' corresponding components. The largest absolute difference among all the pairs of components is the Chebyshev Distance. The larger the Chebyshev Distance, the lower the similarity between the vectors.

A Jaccard Distance between two vectors is calculated as a ratio between the size of the intersection between the vectors (based on elements in common between the vectors) to the size of the union between the vectors (based on elements in either or both of the vectors). Jaccard Similarity is defined by the ratio, and Jaccard Distance is defined as one minus the Jaccard Similarity.

The Sørensen-Dice Similarity is calculated as two times the number of elements in common among the vectors divided by the sum of the number of elements in each vector. The Sørensen-Dice Distance is one minus the Sørensen-Dice Similarity.

A Levenshtein Distance is a string similarity metric used to measure the minimum number of single-character allowed operations (insertions, deletions, or substitutions) required to transform one string into another.

Regardless of the distance metric used, a code analysis system may determine that code metadata is similar to code issue data and/or a query about code (e.g., about the code itself or about issues with the code). The code analysis system may determine that code issue data is similar to code metadata and/or a query about code. The code analysis system may also determine that a query is similar to code issue data and/or code metadata. These similarities may be used to inform a large language model of additional context to find relevant code issues, relevant code metadata, and/or relevant answers to a query.

Generating LLM Prompts Using Retrieved Information

In various embodiments, information relevant to a potential issue or query is selected from a dataset for use in generating a prompt to a LLM. The prompt may include an initial question which may, for example, be selected from a template corresponding to a use case.

The prompt may also include guidelines for the LLM to generate a response such as, for example, a format of the result, constraints on the result values, and other instructions that may be fixed across multiple templates or specific to the template corresponding to the use case.

In addition to the initial question and guidelines, the prompt may also include example results and/or example information that may be relevant to the results. Such information or example results may be delimited from the rest of the prompt so that the LLM may consume the additional information while still responding to the initial question within the guidelines of the prompt.

For example, a prompt may pass an initial query or application-specific use case (e.g., expanding issues to code that may have the issue, or checking for issues that may be present in a set of code) along with context in the form of code issue data, code metadata, and/or query information that was determined to be similar to a seed value related to the initial query or application-specific use case. Various examples are covered in more detail in the following sections.

Using a Knowledge Base to Answer Natural Language Queries about Code

An example system may receive natural language queries from a user and provide and provide a contextualized response to the user by generating an LLM prompt by augmenting the user query with other sources of information such as an issue knowledge base, code metadata, and/or other information specific to a pipeline that the user is using.

By way of example, the system may receive an input query such as "How do I resolve a build failure due to dependency conflicts?" In this example, rather than providing a generic response from a generic LLM or from a traditional search engine, the system provides a contextualized resolution recommendation that accounts for the specific pipeline that the user is operating on. For example, the system may identify relevant historical failure patterns associated with the pipeline and/or resolutions related to build failures and dependency conflicts (e.g., in a knowledge base of the pipeline). The system may generate a contextualized resolution based on the retrieved data and the input query, thereby providing actionable guidance to resolve the specific issue that the user likely experienced. For example, the system may generate a modified LLM prompt with information specific to the pipeline of the user (e.g., code metadata, code review comments, etc.) and/or relevant records from the issue knowledge base (e.g., historical failure patterns associated with similar code, resolution descriptions/issue descriptions that include key terms like 'dependency' or 'build', etc.). The LLM results can then be used to provide a contextualized resolution recommendation to the user.

As another example, if a user asks about existing problems or issues that have been detected (and/or how to address these problems), the system can use RAG to identify relevant issues in the issue knowledge vector database and/or relevant sets of code. The relevant issues or sets of code that are identified to be similar may be expanded to find associated sets of code or issues that might provide additional context for the similar issues or sets of code. The relevant records from the vector database and/or any associated records from the code development pipeline can then be combined with the user query as an augmented LLM prompt. The LLM response can be further refined (by modifying the prompt) to identify the top 5 or 10 any other ranked list of potential resolutions and/or relevant issues that were encountered. Thus, the system can prepare a relatively more tailored or accurate response (e.g., as compared to a response from a generic LLM or other search engine) to the user's query by relying on other sources of information such as the issue knowledge base and/or code metadata to provide context information in the LLM prompt. For example, the system may perform a semantic similarity analysis of the text in the input query, text in code review comments/other code metadata, and/or text in the issue knowledge (e.g., issue descriptions, resolution descriptions, etc.) to further refine the scope of the LLM prompt and/or provide useful context.

FIG. 1A illustrates a flow chart of an example process 100A that analyzes code and/or code issues in response to a query. The process 100A begins at block 102A with an example intelligent code analysis system accessing, in a code inquiry session, a request comprising natural language content requesting information about code. For example, the system may receive the natural language content as user input from a user inquiring about a code issue or other code (e.g., "How do I resolve a dependency issue?").

At block 104A, the process 100A involves the example system generating a request vector embedding representing the request based at least in part on the natural language content. For example, the request vector embedding may include a text blob that describes the request (e.g., including keywords extracted from the request, excluding stop words, etc.).

At block 106A, the process 100A involves the example system accessing content vector embeddings representing a plurality of items of code-related content. In one example, the plurality of items of code-related content includes data from an issue knowledge base (e.g., issue descriptions, resolution details, timestamps, etc.) about previously detected issues or resolutions. In one example, the plurality of items of code-related content includes code metadata (e.g., code quality metrics, code review comments, comments embedded in code, etc.) associated with the code of the request and/or other sets of code. Thus, in some examples, the plurality of items of code-related content comprises content describing functionality of the plurality of sets of code.

At block 108A, the process 100A involves the example system determining a plurality of distances between the content vector embeddings and the request vector embedding. The example system may use any distance function or other method of determinations of numerical or vector similarities, such as Cosine Distance, the Euclidean Distance, the Pearson Correlation Coefficient, the Manhattan Distance, the Minkowski Distance, the Hamming Distance, the Chebyshev Distance, the Jaccard Distance, the Sorensen-Dice Distance, the Pearson correlation coefficient, the Levenshtein distance, or any other means of calculating correlation. Thus, the plurality of distances may represent a similarity of each content vector embedding with respect to the request vector embedding.

At block 110A, the process 100A involves the example system selecting a subset of the plurality of items of code-related content that provide information about at least one set of code. The selection at block 110A is based at least in part on the plurality of distances, and the selection is to support communication with a large language model. For instance, the example system may select items of code-related content (e.g., past issues, resolutions, code metadata, etc.) that is most relevant to the request, i.e., items having vector embeddings with the shortest distances or that otherwise most similar to the request vector embedding.

In some examples, the plurality of items of code-related content comprises content describing a dependency of at least one of the plurality of sets of code. In these examples, the process 100A also includes the issue analysis system 206A selecting the subset of the plurality of items of code-related content further based on the dependency.

At block 112A, the process 100A involves the example system generating a prompt for execution at least in part by a large language model. The prompt comprises at least some of the natural language content requesting information about code. For example, the system may adjust the format of the natural language content to improve the relevancy of the prompt to what the user submitting the request likely intended.

At block 114A, if the subset of the plurality of items (determined at block 110A) is empty (i.e., if there are no relevant records in the knowledge base), then the process 100A may proceed to 118A, where the example system may prompt the large language model with the prompt generated at block 112A. Otherwise, if the subset of the plurality of items includes at least one item, then the process 100A proceeds to 116A.

At block 116A, the process 100A involves the example system augmenting the prompt to further comprise at least some information from each item of code-related content in the subset of the plurality of items of code-related content. For example, the system may augment the original natural language content request with information obtained from the knowledge base that is relevant to the request (e.g., previously detected issues, previously applied resolutions, code metadata of other sets of code that are similar to the code of the request, etc.).

At block 118A, the process 100A involves the example system prompting the large language model with the prompt. For example, the prompt may be a modified version of the original natural language content request that is augmented with relevant information from the knowledge base to provide context for the request. The system may thus communicate the augmented prompt to the LLM (e.g., via an API of a LLM provider or other connection).

At block 120A, the process 100A involves accessing a result based at least in part on execution of the prompt (e.g., by the LLM). For example, the system may receive the result of the prompt from the LLM. The result may include information received from the LLM based on the prompt that was provided to the LLM.

At block 122A, the process 100A involves the example system storing, in association with the code inquiry session and based at least in part on the result, a response to the request. The response may identify one or more issues and/or one or more sets of code. For example, the system may cause display of the response via a user interface to a user who submitted the request. For instance, if the request was "How do I resolve a dependency issue?", the system may output a response that lists the most relevant and/or successful resolutions that were applied to resolve code dependency issues, e.g., in other sets of code that have a similar code functionality as the code associated with the request. Thus, in some examples, the process 100A may involve determining the one or more issues (e.g., based on the response).

In some examples, the process 100A includes determining at least one issue of the one or more issues based at least in part on a stored association between at least one set of code and the at least one issue. In these examples, the prompt may also include an identification of the at least one issue and the at least one set of code associated with the at least one issue. For example, the issue knowledge base may include a record of previous error detection that associates the at least one set of code with the issue of the query. In this case, the example issue analysis system may augment the prompt to identify the at least one issue and/or the at least one set of code associated therewith.

In some examples, the plurality of items of code-related content comprises content describing at least one issue of the one or more issues. For example, the plurality of items may include detected issue descriptions of one or more code sets. In some examples, the process 100A also determining the one or more sets of code (e.g., based on the one or more sets of code being associated with the at least one issue). Additionally or alternatively, in some examples, the process 100A also includes determining at least one set of code of the one or more sets of code based at least in part on a stored association between the at least one set of code and the at least one issue, and the prompt further comprises an identification of the at least one issue and the at least one set of code associated with the at least one issue. For example, where the at least one issue is identified, sets of code associated with that issue can be indicated in the augmented prompt to the LLM.

FIG. 2A illustrates a system diagram 200A showing an example issue analysis system 206A that analyzes code and/or code issues in response to a query. In the illustrated example, the system diagram 200A includes an intelligent code analysis system 204 and one or more large language models 220. The intelligent code analysis system 204 includes the issue analysis system 206A, an issue knowledge vector database 212, and a code repository 214. The issue analysis system 206A is an example system configured to perform the functions of the process 100A described above.

The issue knowledge vector database 212 includes any database configured to store information about code issues and resolutions collected over time during the lifetime of CICD pipelines. The code repository 214 includes one or more sets of code corresponding to one or more pipelines. In some examples, the issue knowledge vector database 212 and/or the code repository 214 store code metadata describing aspects of each set of code (e.g., code complexity, dependency graphs, etc.).

The issue analysis system 206A includes a user interface 208A, a retriever 210, a prompt generator 216 and an LLM interface 218. In an example scenario, the user 202A submits natural language content corresponding to a request for information about code. For example, the user may input a query such as "How do I resolve a build failure due to dependency conflicts?" The user interface 208A then uses the retriever 210 to obtain information about one or more sets of code and/or issues relevant to build failures and/or dependency conflicts from the issue knowledge vector database 212 and/or the code repository 214. The prompt generator 216 then generates a prompt based on a request vector embedding corresponding to the request indicated in the natural language content and augments the prompt with one or more vector embeddings corresponding to the selected sets of code and/or issue/resolution information relevant to the request, which are retrieved from the issue knowledge vector database 212. The LLM interface 218 then submits the augmented prompt to the LLM(s) 220 and receives a result indicative of a natural language response for the user 202A. For example, the user interface 208A may display, based on the result, one or more recommended resolutions, one or more relevant issues, and/or one or more sets of code. In some examples, the issue analysis system 206A may select the displayed resolutions and/or order the displayed resolutions based on a determination of a rank for the one or more issues.

FIG. 3A illustrates a diagram of an example user interface 300A configured to implement the example user interface 208A of the issue analysis system 206A. As shown, the user interface 300A includes an input region 308A for submitting queries about code and/or code issues. The user interface 300A includes a header bar 302A which may display information (e.g., user image 304A) relevant to a user (e.g., user 202A) of the user interface 300A. In the illustrated example, the user interface 300A includes a combined result 306A element, which displays natural language content summarizing a response to the query (input at 308A), in line with the discussion above. Additionally, the user interface 300A includes a list of issues relevant to the result 310A, e.g., which may include issues associated with other sets of code that had a relevant bug (e.g., build failure due dependency issue, etc.). The user interface 300A also shows a list of sets of code 312A relevant to the result of the query.

In some examples, the process 100A also includes the issue analysis system 206A causing display of the response to the request of the user (e.g., user 202A) on a user interface (e.g., user interface 300A) that results from a submission of a user query from an authenticated user (e.g., user 202A) to an input region (e.g., input region 308A) as part of the code inquiry session with the authenticated user.

In some examples, the process 100A also includes the issue analysis system 206A determining one or more sibling sets of code (e.g., code bases 312A) that are functionally parallel to the code for which information is requested by the natural language content. In these examples, the prompt may also include information about the one or more sibling sets of code. For example, the system 206A may augment the prompt sent to LLM 220 to indicate information about the sibling sets of code (e.g., pom.xml, JacksonExample.Java, etc.).

In some examples, the process 100A also includes the issue analysis system 206A determining one or more sibling sets of code that are functionally parallel to a particular set of code having a particular issue identified by the natural language content, and the prompt may further comprise information about the one or more sibling sets of code. For instance, in the example of user interface 300A, the code bases 312A may have a particular issue (e.g., 'Build Failure') identified by the natural language content in 308A.

In some examples, the process 100A also includes the issue analysis system 206A determining, using a machine learning model other than the large language model, two or more rank scores of two or more resolutions associated with the one or more issues based on the response. In these examples, the process 100A also includes the issue analysis system 206A selecting, based on the two or more rank scores, a recommended resolution for an issue identified by the large language model based at least in part on the natural language content. For example, as described in the combined result 306A of user interface 300A, the resolutions for two specific bugs may be listed in order and recommended for "removing conflicting transitive dependencies."

Using Relevant Information from a Knowledge Base to Detect Issues Relevant to Code Functionality Examples described herein include systems and methods for using relevant information from a knowledge base to detect issues relevant to code functionality. For example, a system may receive a code submission (e.g., for code review) from a software developer or a code reviewer via a user interface, passed into an API, or by making an update to a set of data monitored for updates. The system may use a RAG database, issue knowledge base, code metadata, LLMs, etc., to facilitate smart code review functionality. For example, the system may generate an LLM prompt that can provide insights about potential issues and potential resolutions associated with this code submission based on the information incorporated in the LLM prompt. For example, the system may determine code metadata for the code submission, such as cyclic complexity, number of decision points, dependencies, textual comments embedded in source code, code review feedback from code reviewers who reviewed previous versions of this code submission, etc. The system could also obtain code metadata for other sets of code (e.g., in the same project, etc.) that may be similar to the new code submission. The system could also identify historical failure patterns in the issue knowledge base, for example, based on semantic similarities or keyword matches between the code metadata and issue/resolution descriptions in the knowledge base. The system may then provide an augmented LLM prompt using all the relevant collected information to the LLM model. Finally, the system may determine, based on the LLM response, one or more potential issues and/or recommended resolutions for the new code submission.

By way of example, the system could provide a code reviewer with insight about potential issues based on the various relationships between specific code quality metrics of the new code submission and historical failure patterns in the issue knowledge base. Alternatively, for example, the system may generate a general prediction or likelihood of whether the new code submission should be approved or if a more detailed review should be performed first based on the historical information considered. These insights may be determined from the LLM response upon consideration of all the relevant information incorporated in the LLM prompt.

In an example, LLM feedback may help the system identify code issues detected after deployment which may be suggested or contemplated in code metadata (e.g., static analysis, code review comments, etc.) but not detectable until code is deployed (e.g., even if code passes standard testing, etc. For example, there may be code issues that are related to orchestration or other runtime issues that are not easily detected during build or code review (e.g., external dependencies in terms of infrastructure or orchestration). However, with the example systems and methods herein, these issues can be proactively predicted based on the issue knowledge base identifying similar issues in previous deployments of other similar code.

In an example, the system may be configured to rank potential issues and/or resolutions by composing the LLM prompt using specific information relevant to the code being reviewed (e.g., code metadata, etc.). For example, where multiple issues or resolutions are possible, the system can use a ranking algorithm to identify the most likely issue or resolution.

In some examples, the system can compose the LLM prompt by including the new code submission (or a portion thereof) in the LLM prompt in addition to or instead of code metadata associated with the new code submission (or other sets of code). In these examples, the system may also include relevant historical information from the RAG or issue knowledge vector database to further focus the scope of the LLM response.

FIG. 1B illustrates a flow chart of an example process 100B that supports integration and/or deployment of code accounting for known code issues. Process 100B begins at block 102B, where an example intelligent code analysis system generates a particular vector embedding representing a set of content describing functionality of a set of code. For example, the system may generate code metadata or other vector embedding about code submitted by a user for code review.

At block 104B, the example system generates issue vector embeddings representing a plurality of issues based at least in part on sets of natural language describing information about the plurality of issues. For example, the system may obtain information about issues and/or resolutions from a knowledge base. The information may include issue descriptions, resolution comments, and/or code metadata about the code associated with the issue/resolution record. This information (e.g., issue description, resolution details, etc.) may correspond to the sets of natural language at block 104B.

At block 106B, the example system determines a plurality of distances between the plurality of issue vector embeddings and the particular vector embedding. For example, the example system may determine similarities between the issue/resolution information indicated by the issue vector embeddings and aspects of the code associated with the particular vector embedding (e.g., graph dependencies, code complexity, etc.). The plurality of distances may indicate the similarity.

At block 108B, the example system selects, to support communication with a large language model, a subset of the plurality of issues based at least in part on the plurality of distances. For example, the system may select the most relevant issues identified based on their similarity with (and/or the similarity of their associated code with) the set of code associated with the particular vector embedding.

In some examples, the set of content comprises content describing a framework of the set of code (e.g., Java, etc.), an architecture of the set of code (e.g., microservice, etc.), dependencies of the set of code, a complexity of the set of code (e.g., code complexity), and/or a resource utilization pattern of the set of code. In these examples, selecting the subset of the plurality of issues may be further based on the framework, the architecture, the dependencies, the complexity, and/or the resource utilization pattern.

At block 110B, the example system generates a prompt for execution at least in part by the large language model. The prompt may comprise at least some content of the set of content. For example, the example system may generate the prompt using part or all of the information describing the set of code (e.g., sections of code, or tokenized information describing code functionality or code metadata).

In some examples, the process 100B also includes the example code analysis system determining one or more sets of code that are functionally parallel to the set of code described by the set of content. In these examples, the process 100B also includes augmenting the prompt to further comprise information about the one or more sets of code.

In some examples, the process 100B also includes the example code analysis system determining one or more sets of code having an issue indicated in the set of content describing functionality of set of code. In these examples, the process 100B also includes augmenting the prompt to further comprise information about the one or more sets of code. For example, if the set of content describing the functionality of the set of code (e.g., code review comments, code comments, comments on previous code release, etc.) suggests that the code might have this issue, then this information may be added to the prompt.

At block 112B, if the subset of plurality of issues is empty (e.g., no issues found in knowledge base that are relevant to the set of code submitted for review), then the process 100B proceeds to step 116B. Otherwise, the process 100B continues at step 114B.

At block 114B, the example system augments the prompt to further comprise at least some natural language describing each issue of the subset. For example, the system may augment the prompt with information about issues identified as relevant because they were detected in other sets of code that are similar (e.g., in terms of functionality) to the set of code of the particular vector embedding.

At block 116B, the example system prompts the large language model with the prompt. For example, the system may communicate the prompt via an API of the LLM.

At block 118B, the example system accesses a result based at least in part on the execution by the LLM. For example, the system may receive a natural language response corresponding to the result.

At block 120B, the example system stores a new association between a particular issue and the set of code based at least in part on the result. For example, the system may identify a particular issue as being potentially present in the code being reviewed (based on the result from the LLM).

In some examples, the process 100B also includes the example system determining that the particular issue is a top-ranked issue candidate for the set of code. In these examples, storing the new association is based on the determination that the particular issue is a top-ranked issue candidate. For example, the example system can use a ranking algorithm (e.g., RankNet) to determine a rank of one or more potential issues, and may then identify the particular issue based on it being a top or top-k ranked issue candidate for the set of code (e.g., according to the RankNet model).

At block 122B, the example system causes display of information identifying the particular issue as a candidate issue for the set of code. For example, the system may output in a user interface a natural language response that notifies the user who submitted the set of code about the particular issue and/or one or more recommended resolutions.

Figure 2B:
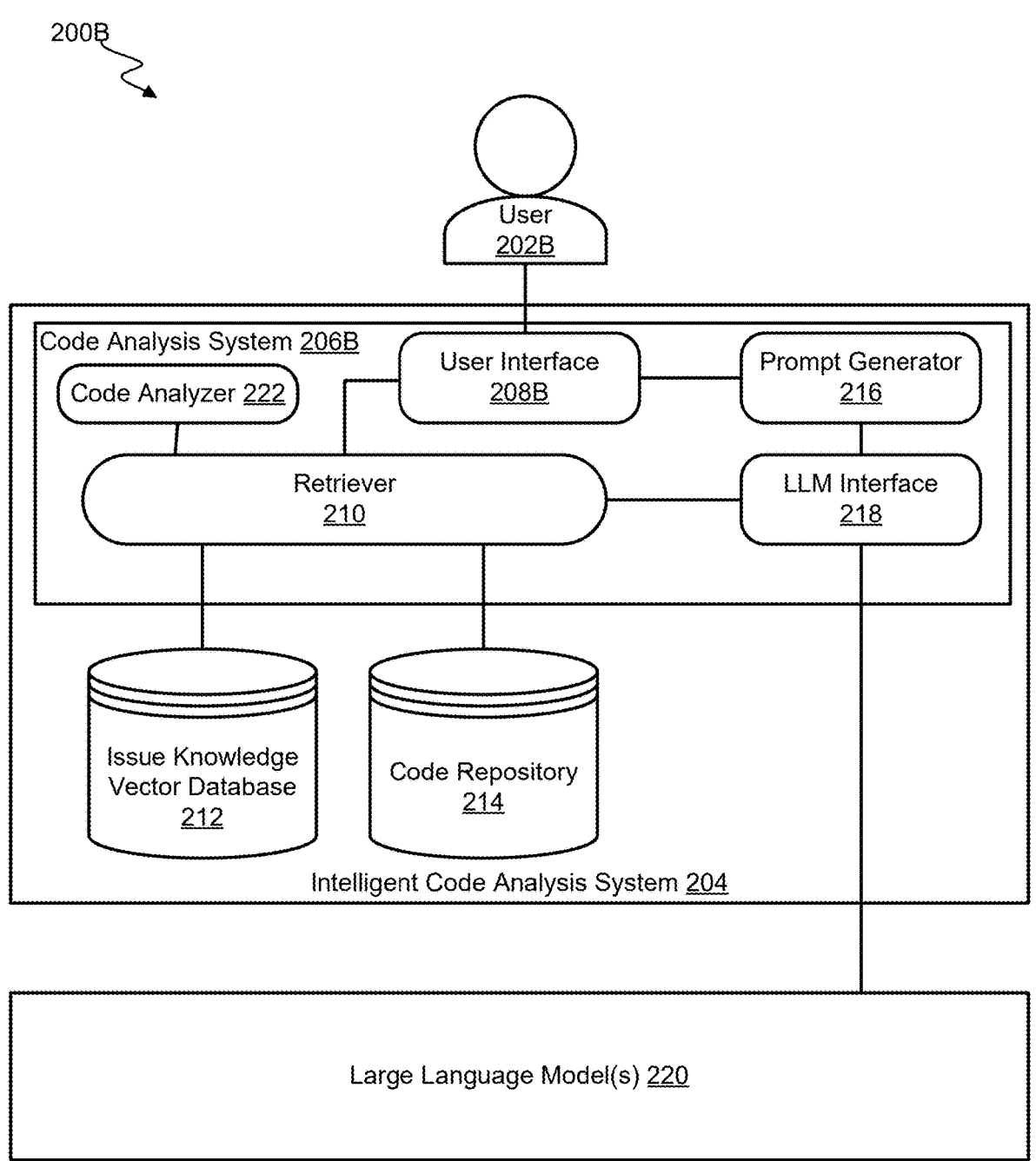
FIG. 2B illustrates a system diagram showing an example code integration and deployment system that supports integration and/or deployment of code accounting for known code issues.

FIG. 2B illustrates a system diagram 200B showing an example code integration and deployment system that supports integration and/or deployment of code accounting for known code issues. In the illustrated example, the intelligent code analysis system 204 of the system diagram 200B includes a code analysis system 206B. The code analysis system 206B includes a user interface 208B and a code analyzer 222.

By way of example, the user interface 208B may receive an input from the user 202B (or from other system components) such as a submission of code for review. The code analyzer 222 may generate a particular vector embedding representing a set of content (e.g., code metadata) describing functionality of the set of code received at the user interface 208B. For example, the set of content may include code metadata describing aspects such as language, dependencies, code complexity, etc., or other code metadata describing the functionality of the code input by the user 202B. The retriever 210 may retrieve issue vector embeddings representing a plurality of issues based at least in part on sets of natural language describing information about the plurality of issues. For example, the retriever 210 may retrieve information about the plurality of issues from the issue knowledge vector database 212 and/or the code repository 214. The prompt generator 216 may then determine a plurality of distances between the plurality of issue vector embeddings and the particular vector embedding (of the input set of code). Based on the distances (i.e., similarity), the prompt generator may generate a prompt that includes at least some content about the code received in the user interface, augmented with at least some natural language (e.g., issue descriptions, resolution details, etc.) describing a subset of the plurality of issues (e.g., the top-k issues associated with code that is similar to the code under review). The LLM interface 218 may then communicate the augmented prompt to the LLM(s) 220, and receive a result from the LLM 220. Based on the result, the user interface 208B may display to the user 202B a response (e.g., natural language content) that identifies one or more potential issues that may be present in the code submitted for review.

Figure 3B:
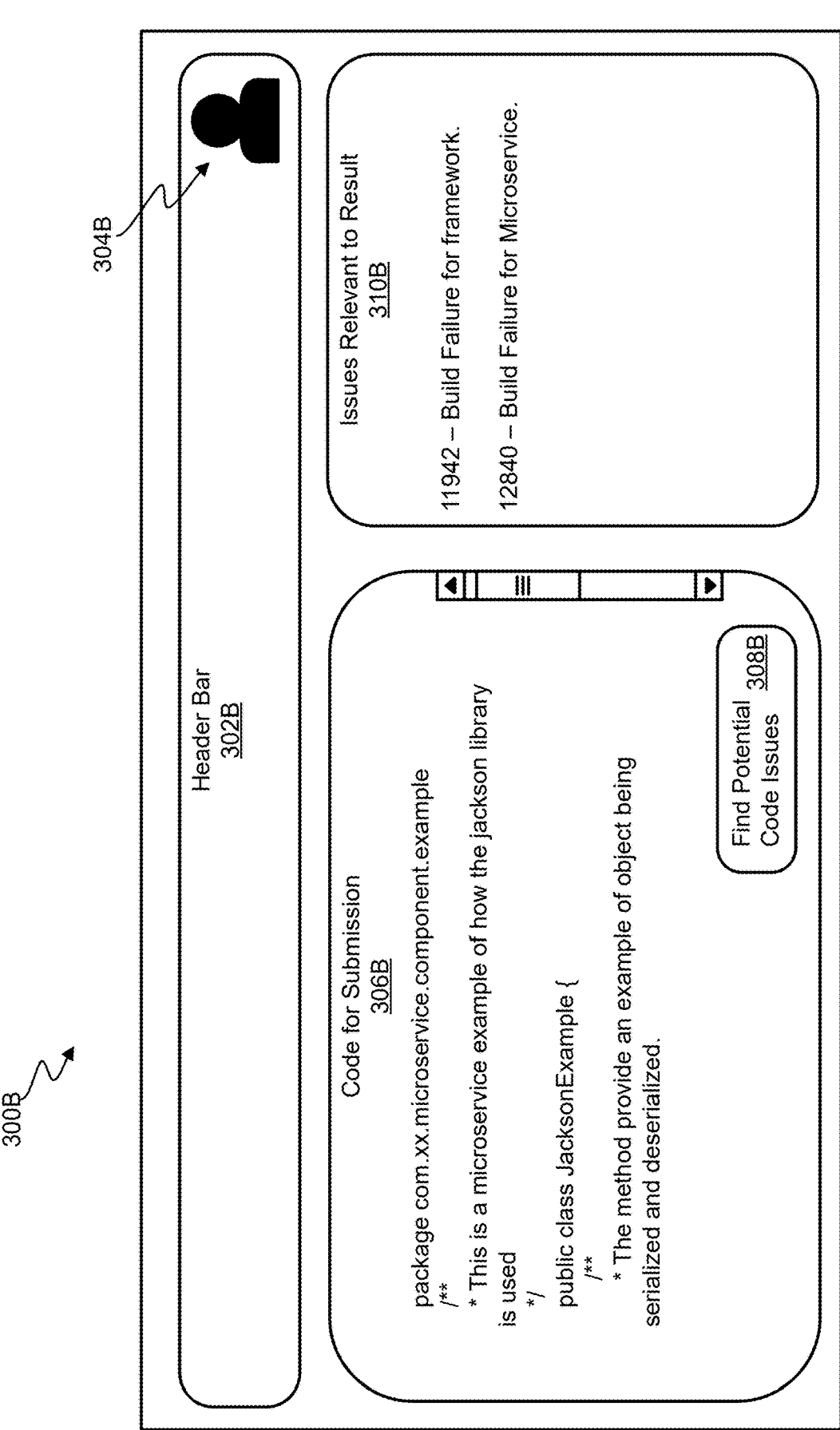
FIG. 3B illustrates a diagram of an example user interface showing a summary of code issues relevant to a selected code base.

FIG. 3B illustrates a diagram of an example user interface 300B showing a summary of code issues relevant to a selected code base. The user interface 300B includes a header bar 302B showing a user image 304B similarly to, respectively, header bar 302A and user image 304A. In the illustrated example, the user interface 300B includes an input region 306B, in which a user can input code for review. The user interface 300B also includes an element 308B for requesting that the system find potential code issues. The user interface 300B also includes an issues relevant to result 310B element that displays potential issues identified in the submitted code and may also include identifiers of these issues (e.g., 11942, 12840). In some examples, the user interface 300B may also display recommended resolutions for these issues and/or identify which part of the code for submission 306B is problematic.

In some examples, the process 100B also includes the code analysis system 206B determining, using a machine learning model other than the large language model, two or more rank scores of two or more resolutions associated with the subset of the plurality of issues based on the result. In these examples, the process 100B also includes the code analysis system 206B selecting, based on the two or more rank scores, a recommended resolution for an issue identified by the large language model based at least in part on the natural language. For example, as displayed in the issues relevant to result 310B of user interface 300B, two recommended resolutions for two specific bugs may be listed in an order that is based on their rank.

Using Relevant Information about Code Functionality to Proactively Detect Sets of Code Relevant to Known Issues Example systems and methods are described herein for using relevant information about code functionality to proactively detect sets of code relevant to known issues. By way of example, the system may detect a new issue and/or resolution added to the issue knowledge vector database, or otherwise receive input indicating an issue for analysis. The new issue or issue for analyses may be expanded proactively to find sets of code potentially relevant to the new issue or issue for analysis. Information about the sets of potentially relevant code may be input to an LLM as context for a prompt in order to advise a user on whether the issue is potentially present in the sets of code. Prior to expanding the issue, the issue would not have otherwise been associated with at least some of the sets of code provided as context to the LLM.

In one embodiment, the issue for analysis may initially be identified via a user interface, a user query, a newly recognized issue, a triggered notification or anomaly about an issue, or any other event associated with the issue. The issue for analysis may then be expanded to discover the sets of code potentially relevant based on those sets of code that have similar vector embeddings to the issue vector embeddings for the issue for analysis. The similar sets of code may be input into an LLM as context to recommend which sets of code are more likely to be impacted by the issue for analysis and which are not.

In this example, the system may compose an LLM prompt that describes the new issue and provides context from the issue knowledge base, associated code metadata and/or code metadata for a same project or pipeline as the associated code metadata, and/or code metadata that is not currently associated but otherwise determined to be similar to the issue for analysis (for example, based on similarities between vector embeddings between the issue for analysis and code metadata from a corpus of code metadata). In this way, by leveraging the contextual information learned from the code metadata and the issue knowledge vector database, the system may receive an LLM response that identifies one or more other sets of code that are likely to have the same issue as the code associated with the issue for analysis.

In one example, information about code logic relationships and/or functionality may be captured from code comments (e.g., incorporated as metadata), such as comments describing the functionality of various software components entered as commented text embedded in source code files or as code reviewer notes. Vector embeddings of such content may be determined to be similar to the vector embeddings of the code issue content, in which case information about sets of code having the similar embeddings may be included in a prompt to an LLM when inquiring about whether and which other sets of code may have the issue for analysis.

In one example, the system may include other sets of code based on hierarchical information incorporated in the LLM prompt. For example, knowledge of the hierarchical relationships may help the system focus the scope of the LLM response based on parent-child relationships between software components associated with the issue (e.g., library that has new issue is a child of another class, object having issue is a child of another object, other children of an object having issue, etc.). Further, for example, the code metadata my include indication of component type (e.g., microservice, etc.) of various sets of code. The system can use this information further narrow the scope of the LLM prompt and/or LLM response. Thus, code metadata can be used to provide information about how various software libraries are packaged which can be used to detect potential issues in related software components whenever a new issue detected in any one component.

In an example, the system can identify a group of software packages or sets of code that are similar to code associated with a particular issue. To facilitate this, the system can perform semantic similarity analysis between the code metadata (e.g., code comments, etc.) of the code associated with the issue and code metadata associated with other sets of code. In this example, the system can then provide an augmented LLM prompt including a tokenized representation of the relevant similar code bases (e.g., having similar code metadata) and information from the issue knowledge base to facilitate identifying which of this specific sets of code may have the same particular issue. In this way, for example, the search space of other sets of code having a particular issue can be narrowed by identifying the potential code bases that might have an issue in the augmented LLM prompt Thus, in some examples, the LLM can be used to find other sets of code having specific features (or that are likely to have a specific issue) without necessarily submitting any actual code from the package to the LLM. The code metadata submitted with the LLM prompt may be sufficient to teach the LLM how to detect a specific anomaly, etc., without necessarily including the actual code in the LLM prompt. For example, comments submitted during code review can have semantic similarities with issue descriptions and/or resolution descriptions in the issue knowledge base, which may be sufficient for the LLM to predict the likelihood that an issue may be present in another set of code without being trained using actual code.

FIG. 1C illustrates a flow chart of an example process 100C that analyzes code issues to find relevant code bases. The process 100C begins at block 102C where an example intelligent code analysis system generates a plurality of vector embeddings representing a plurality of sets of content describing functionality of a plurality of sets of code. For example, the system may retrieve code metadata of code in a code repository, where the code metadata describes code functionality of a plurality of sets of code. As another example, the code functionality may be additionally or alternatively described in issue/resolution records associated with the plurality of sets of code.

At block 104C, the example system accesses natural language describing an issue detected in a set of code. For example, the system may receive user input or other natural language content that describes an issue detected in a particular set of code. In an example, the natural language may be stored in a issue knowledge base record for a recently detected issue (e.g., including a title of the issue, a description of the issue, resolution details, review comments, etc.).

At block 106C, the example system generates an issue vector embedding representing the issue based at least in part on the natural language. For example, the system may extract the issue description, code metadata associated with the set of code that has the issue, and/or other relevant information from the issue knowledge database and/or code repository.

In some examples, the process 100C also includes the example system generating the issue vector embedding at block 106C based at least in part on the set of code in which the issue is detected. For example, the issue vector embedding may include code metadata describing functionality of the code (e.g., to facilitate finding other code sets with similar functionality).

At block 108C, the example system determines a plurality of distances between the plurality of vector embeddings and the issue vector embedding. For example, the distances may indicate similarity between the issue vector embedding and vector embeddings of the plurality of sets of code. This similarity analysis, for example, may indicate whether a particular set of code has similar features (e.g., based on code metadata) to the set of code associated with the issue. For instance, vector embeddings of code sets that are similar to the code having the issue (e.g., having a same dependency on a same library, etc.) may have a lower distance to the issue vector embedding than less similar code set.

At block 110C, the example system selects, to support communication with a LLM, a subset of the plurality of sets of content describing functionality of a subset of the plurality of sets of code based at least in part on the plurality of distances. By way of example, the system may select the subset of code sets that have similar functionality (e.g., threshold low distance) with respect the set of code associated with the issue.

In some examples, the plurality of sets of content comprises content describing an architecture of at least one of the plurality of sets of code, dependencies of the plurality of sets of code, code complexity of the plurality of sets of code, resource utilization patterns of the plurality of sets of code, and/or deployment frequencies of the plurality of sets of code. In these examples, the process 100C may also include the example system selecting the subset of the plurality of sets of content further based on the architecture, the dependencies, the resource utilization patterns, and/or the deployment frequencies.

At block 112C, the example system generates a prompt for execution at least in part by the LLM. The prompt comprises at least some natural language describing the issue. For example, a system may generate a prompt that includes an issue description obtained from an issue knowledge base record of the issue. The system may also include, in the prompt, other information about the issue, resolution details, code functionality, etc., in a natural language format.

In some examples, the process 100C also includes the example system determining one or more sets of code that are functionally parallel to the set of code (e.g., by comparing code metadata of the set of code with code metadata of the one or more sets of code). In these examples, the process 100C may also include augmenting the prompt to further comprise information about the one or more sets of code.

At block 114C, if the subset of the plurality of sets of content is empty (e.g., no sufficiently similar code sets were identified at block 110C), then the process 100C may proceed at step 118C. Otherwise, the process 100C proceeds at step 116C.

At block 116C, the example system augments the prompt to further comprise at least some content from each set of content in the subset of the plurality of sets of content. For example, the system may include, in the prompt, code set identifiers (e.g., file name, code set token, etc.) and/or other code metadata associated with the subset of code sets that are deemed to potentially have the same issue (e.g., based on their similarity with the code having the issue).

At block 118C, the example system prompts the LLM with the prompt. For example, the system may use an API of the LLM to communicate the augmented prompt.

At block 120C, the example system accesses a result based at least in part on the execution by the LLM. For example, the system may receive a response to the prompt from the API of the LLM.

At block 122C, the example system stores a new association between a particular set of code and the issue based at least in part on the result. By way of example, the system may identify the particular set of code as being likely to have the same issue based on similarities between code metadata (e.g., review comments, code comments, reviewer sentiment, description of code, code structure, etc.) of the particular set of code and the set of code known to be associated with the issue. Thus, for example, the system may cause display of the particular set of code to a user and/or an indication that the particular set of code may potentially have the same issue detected for the set of code of 104C.

In some examples, the method 100C also includes the example system determining, using a machine learning model (e.g., RankNet model) other than the large language model, two or more rank scores of two or more resolutions associated with the issue based on the result. In these examples, the process 100C may also include the example issue expansion system selecting, based on the two or more rank scores, a recommended resolution for the issue. For example, the example issue expansion system may find records in the issue knowledge base of two or more previous detections of the issue that were resolved in different ways. In this example, the example system may determine ranks of these potential resolutions and select a recommended resolutions based on the determined ranks.

Figure 2C:
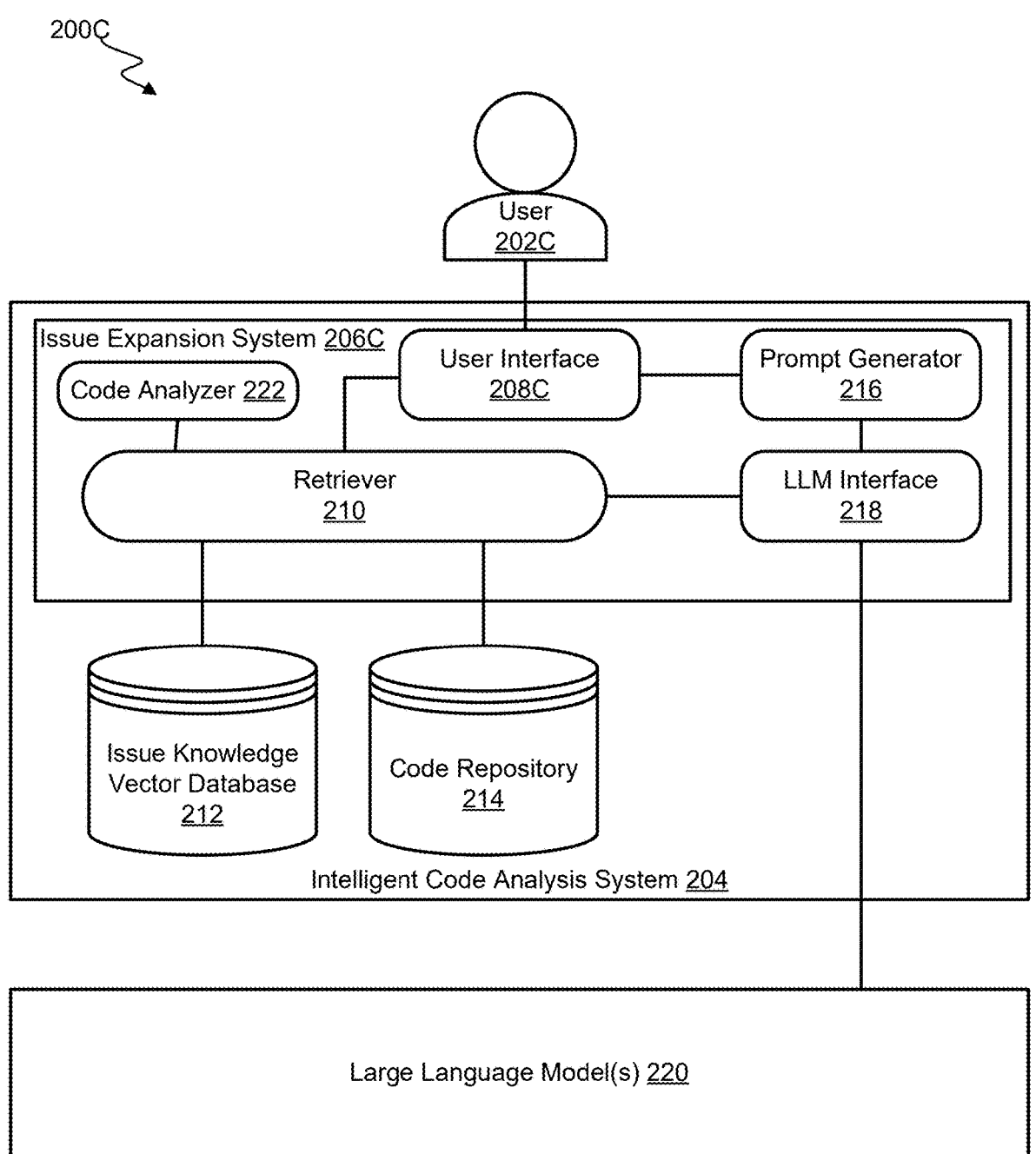
FIG. 2C illustrates a system diagram showing an example issue expansion system that analyzes code issues to find relevant code bases.

FIG. 2C illustrates a system diagram 200C showing an example issue expansion system 206C that analyzes code issues to find relevant code bases. In the illustrated example, the intelligent code analysis system 204 includes an issue expansion system 206C. The issue expansion system 206C includes a user interface 208C configured to receive input from user 202C and/or from other system components.

By way of example, the user interface 208C may receive a request from user 202C to search for code sets that may potentially have a same issue as one that was detected for a set of code. The retriever 210 may access content describing functionality of the set of code (e.g., from the code repository 214) and/or the issue (e.g., from issue knowledge vector database 212) indicated by the user 202C. The retriever 210 may also retrieve (e.g., from code repository 214 and/or issue knowledge database 212) content describing functionality of a plurality of sets of code (e.g., other code bases of interest to the user 202C or that may be part of a relevant project or pipeline). The code analyzer 222 may then analyze the content associated with plurality of sets of code with respect the issue or the set of code associated with the issue.

For example, the code analyzer 222 may analyze similarity (e.g., by computing distances between vector embeddings) between content of each set of code with respect to content associated with the issue or the set of code having the issue. Based on the similarity analysis, the code analyzer 222 may select a subset of the sets of code, e.g., having similar functionality as the set of code that has the issue. Next, the prompt generator may generate a prompt that includes natural language associated with the issue (e.g., issue description, etc.) augmented with content associated with the subset of the plurality of sets of code. The LLM interface 218 then communicates the augmented prompt to the LLM 220, and receives or accesses a result that indicates a response to the prompt. Based on the result from the LLM 220, the user interface 208C may display an indication of one or more code sets (e.g., from the subset of code sets potentially having the same issue) to the user 202C. The user interface 208C may display additional information about the similar code sets (e.g., description of functionality, etc.) or other code metadata obtained from the code repository 214 and/or the issue knowledge vector database 212.

Figure 3C:
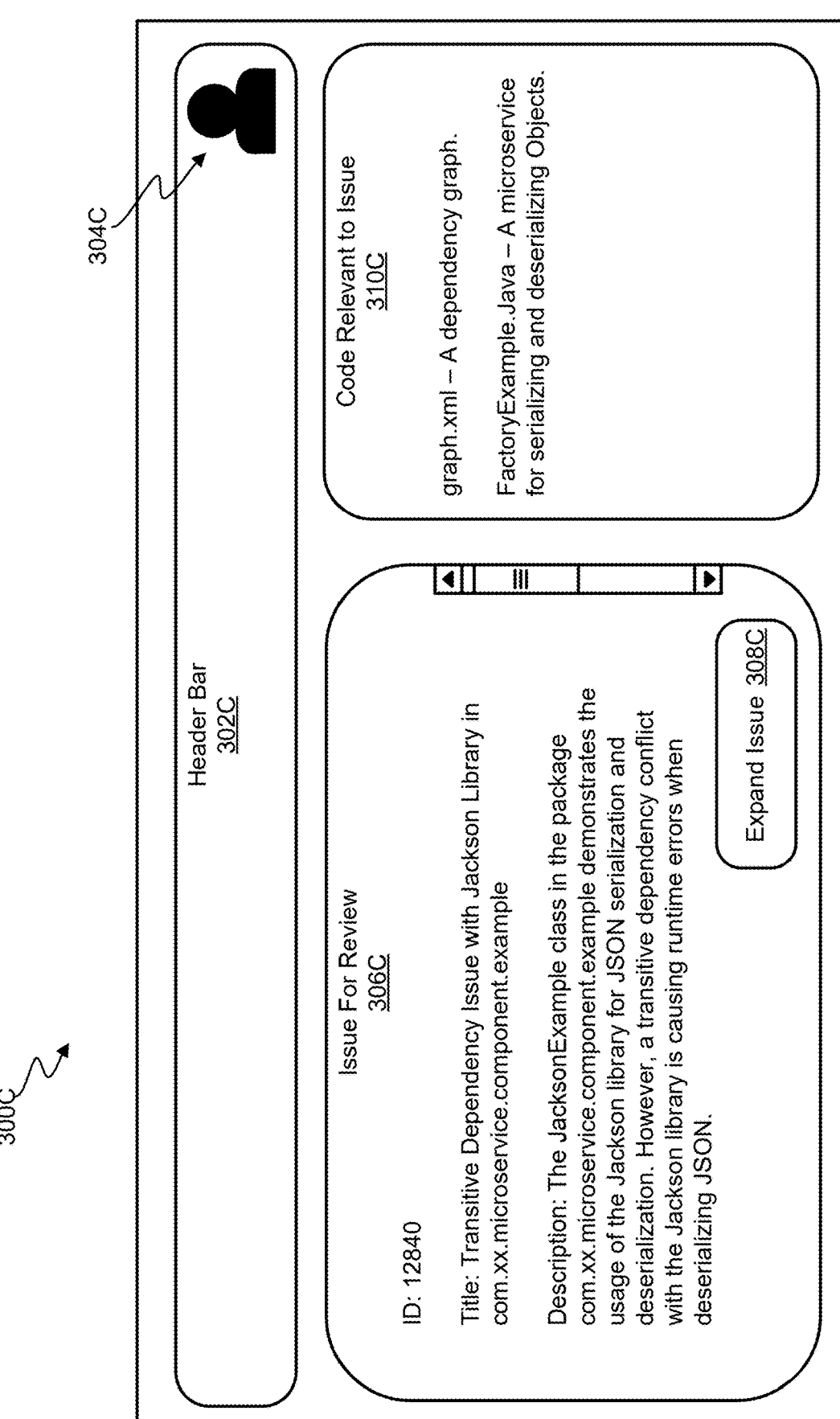
FIG. 3C illustrates a diagram of an example user interface showing a summary of code bases relevant to a selected code issue.

FIG. 3C illustrates a diagram of an example user interface 300C showing a summary of code bases relevant to a selected code issue. The user interface 300C includes a header bar 302C and user image 304C which may be similar, respectively, to header bar 302A and user image 304C. In the illustrated example, the user interface 300C also includes an input region (issue for review 306C) in which a user and/or other system component may indicate a particular issue for review. The user interface 300C also includes an input element (Expand Issue 308C), which a user can interact with to request the system to search for other code bases that may have a similar issue as that described in 306C. As discussed above for the method 100C and system 200C, in response to receiving a selection input at 308C, the system may identify one or more code sets (e.g., graph.xml, FactoryExample-.Java) and display them in the code relevant to issue element 310C. For example, the issue expansion system 206C may select the displayed code sets at 310C as being candidate code sets that may have the same issue (e.g., transitive dependency) as the code set indicated in 306C.

In some examples, the process 100C also includes the issue expansion system 206C causing display of information identifying the particular set of code as a code candidate for having the issue based at least in part on the new association (e.g., stored at block 122C). For example, as shown in user interface 300C, the code relevant to issue 310C element displays two code candidates for having the issue (e.g., 'graph.xml' and 'FactoryExample.Java').

Intelligent Code Issue Analysis, Notification, and Resolution

Aspects of the present disclosure include intelligent code issue analysis, notification, and resolution. An example system performs predictive analysis while various pipelines or code packages are running, e.g., by continuously looking for matches (e.g., top or ranked results) in the knowledge base (e.g., vector database of errors) and/or relevant code metadata. The system outputs the predictive analysis at various stages of the software pipeline (e.g., when a developer submits a new code submission, when a user submits a query, when an automated monitoring or anomaly detection result is detected, etc.).

With respect to CICD, challenges addressed by the example systems and methods herein include anomaly or failure detection, pipeline management, code development support, code issue resolution recommendation, and code quality management. For example, other methods of pipeline failure detection are may be reactive to errors instead of proactive before errors are triggered, and the reactive nature may result in delays in issue resolution. Various embodiments described herein may provide proactive detection mechanisms that analyze historical data and predict potential failures before they occur, which allows applications to take pre-emptive action. Furthermore, other methods may involve manually identifying and selecting resolutions for pipeline failures, which can be time-consuming and error prone. Various embodiments described herein may automate this process by dynamically ranking resolutions based on their historical success rates and contextual relevance, which may ensure that the most effective solutions are implemented promptly. Furthermore, ensuring code quality in cloud-based CICD pipelines facilitates maintaining application reliability and performance. To that end, some aspects of the present method integrate AI-driven code review mechanisms that provide developers with actionable insights into code quality, facilitating the identification and resolution of issues during the development process.

Various embodiments may improve CICD pipeline management efficiency, such that resolution ranking does not lack context and does not rely solely on generic metrics or popularity. Various embodiments may dynamically rank resolutions based on their historical success rates across different contexts and scenarios. By considering contextual information such as failure types, components involved, and historical resolutions, example systems herein may ensure that the most effective solution is prioritized for each specific scenario.

Various embodiments may provide proactive failure identification. In some applications, the proactive nature of the CICD pipeline may support faster development and deployment of applications to the cloud. Thus, any proactive approach to reduce the overall time to identify and triage failures may improve application performance. Various embodiments addresses this by leveraging historical failure patterns stored in the knowledge base of individual applications, e.g., by creating a Retrieval Augmented-Generation (RAG) Vector database of relevant issues and giving context to LLM Prompts to get context-informed results back from an LLM. By analyzing past incidents and predicting potential failure scenarios, an example system proactively identifies issues before they escalate, which may enable organizations to take pre-emptive action. This proactive approach may promote minimizing downtime, reducing the risk of service disruptions, and enhancing overall pipeline reliability. In one embodiment, the system proactively identifies if any of the other pipelines that are running in parallel would result in a failure based on current pipeline failure data at one of the pipeline stages. By doing so, the example method may facilitate saving time for all those actively running pipeline(s) by alerting that their pipeline(s) may potentially fail at a particular stage of the pipeline based on the failure patterns data available in RAG/LLM.

In one embodiment, the code analysis system provides Smart Code Review Integration. Code quality may be promoted in cloud-based CICD pipelines with Smart Code Review Integration, and the code quality may directly impact application reliability and performance. Various embodiments may integrate AI-driven insights from the Issue Knowledge Base and custom Language Model (LLM) into the code review process.

Security may also be improved for CICD pipelines for cloud native applications. In various embodiments, the code analysis system may provide a knowledge base of security issues and/or code vulnerabilities to enhance code review by ensuring or otherwise promoting that code is compliant or more likely to be compliant with security policies and regulations. This integration may enable developers with data-driven assessments of code quality, for example, by facilitating the identification and resolution of issues during the development lifecycle. By providing actionable insights and recommendations, example systems herein may enhance the effectiveness of code review processes and the delivery of high-quality software products.

In one embodiment, the code analysis system identifies code issues by leveraging AI, LLM, and/or RAG techniques to identify code issues proactively, i.e., before the occur. For example, when a new set of code is submitted for review, an example system can detect potential code issues that are traditionally not detectable until a later stage of the pipeline (e.g., deployment issues, integration issues, etc.) by leveraging LLM and RAG using information in an issue knowledge base (e.g., historical failure patterns associated with similar code or similar pipelines or related code or related pipelines) to proactively predict failures likely to occur if the new code submission is deployed.

Additionally, an example system can automatically loop back information about detected issues, attempted resolutions, test results, monitored metrics, etc., associated with every software component in a pipeline to other users, developers, etc., of the pipeline. For example, the system may provide the development team with information learned during deployment of an instance of the CICD pipeline in real time or near real time so that the development team can consider issues detected during deployment as they are developing a future code release or other code under development that could be similarly affected by the issue that was detected in the deployed code. Thus, instead of submitting new code that will likely be affected by an error that was just recently detected, the error can be flagged immediately to the developers at an earlier stage of a pipeline or to other users for intervention (e.g., pausing related or affected pipelines before a similar failure happens).

As another example, whenever an issue is detected or a resolution is submitted, the system may identify, categorize, and rank issues and/or potential resolutions in the knowledge base so that other users or developers can benefit from up-to-date knowledge about code issues. For example, if a new instance of a pipeline is deployed, operations and systems teams can immediately receive notifications about potential failures that are likely to occur proactively rather than waste valuable computing resources until an actual failure occurs. Additionally, developers using the code analysis system can become aware of potential issues in any relevant software components (e.g., parents or children of a faulty library) during development of another software component so that they can proactively avoid potential errors or incorporate previously unconsidered exception handling scenarios in the software component under development.

An example code analysis system may also provide insights about problematic code development patterns that may not otherwise be apparent to a developer of a certain component of a software project. For example, the system may detect that the use of a threshold (or higher) number of global variables in code of a software component may lead to memory leaks or a performance degradation of the overall project even though the use of a same number of global variables is relatively less harmful in a different project or pipeline (e.g., due to resource constraints specific to each project).

An example system may provide efficient, timely, and context-aware looping back of information between development and operation teams associated with a software pipeline. In contrast, other systems may isolate operations and development teams associated with a pipeline. For example, information about pipeline failures detected during operational activities may otherwise be isolated from the development team until a later stage in the software development cycle. In one embodiment, the code analysis system may provide recommendations to both the operational team members and the development team members as soon as new issues are detected or logged, i.e., even before an actual failure occurs and/or soon after a failure is detected, and based on a variety of sources of data from potentially a variety of users. As another example, potential issues associated with bad code practices (e.g., large number of global variables, etc.) can be proactively predicted to notify operations team members or to support operations team members in analyzing the cause of output inaccuracies without necessarily needing the direct involvement of a code reviewer.

To facilitate this, an example code analysis system may perform sentiment analysis on code review comments and/or execute ranking scoring models to analyze code metadata and/or issue/resolution descriptions automatically as new information becomes available at any stage of the software pipeline. For example, prior to code deployment, the system may proactively detect a potential issue that is likely to occur when the code is deployed based on issues detected in previously deployed pipelines, information gleaned from code review comments, and/or issue or resolution descriptions stored in the issue knowledge database.

In some examples, the system is configured to manage multiple related pipelines (e.g., cross pipelines). For example, a data processing result from a first pipeline may be used as input in a second pipeline. An example system may recognize this relationship using metadata associated with the two pipelines. Thus, in this example, the system can use its knowledge of a code issue detected in the first pipeline to predict a future failure of the second pipeline even before the second pipeline is deployed. In this case, the system may notify (e.g., alerting mechanism) a developer or operations team member associated with the second pipeline about the predicted failure so that the developer or operations team member can proactively avoid or mitigate the future potential issue before an actual failure happens or before the second pipeline is deployed. In an example, a developer or operations user can perform a manual user action in response to the notification (e.g., pause deployment of the second pipeline) or the system can perform the user action automatically. Alternatively, for example, the system may schedule one or more rounds of code review for developers to attempt addressing the issue of the first pipeline before deployment of the second pipeline is scheduled.

In another example scenario, the system may identify multiple related pipelines (e.g., pipelines running a similar code base at one or more steps thereof, parallel pipelines, etc.). In this example, if the system detects an issue with any one of the multiple pipelines, users associated with the other pipelines may be notified or alerted proactively that a potential similar issue may occur in the other pipelines. For example, the alert can trigger the other users to proactively pause the other pipelines soon after the issue is detected in the first pipeline (e.g., before similar failures occur in the other pipelines). Alternatively or additionally, the alert may trigger increasing the rank of the issue to be addressed by the development team. For example, if the issue was due to a recent patch, the development or operations team may decide to roll back the patch until the issue is resolved. Rolling back the patch may be considered a potential resolution for the issue.

Referring back to FIG. 4, the failure pattern detection module 418 includes one or more algorithms configured to detect and/or document occurrence of failure patterns in the pipeline (e.g., based on historical failure patterns stored in RAG database 410).

The predictive failure identification module 420 includes one or more algorithms configured to predict potential failures in one or more pipelines proactively (e.g., via time series forecasting or other techniques). In an example, the predictive failure identification module 420 includes an AutoRegressive Integrated Moving Average (ARIMA) model is implemented to forecast potential failure occurrences in the CICD pipeline. In an example, time series data representing historical failure occurrences is preprocessed to remove trends and seasonality (e.g., ensuring or improving stationarity). For model training, the ARIMA model parameters (p, d, q) may be determined using techniques such as grid search or auto-correlation function (ACF) and partial auto-correlation function (PACF) analysis.

In one example, the predictive failure identification module 420 utilizes ARIMA or LSTM for time series forecasting of potential failures. An example mathematical equation for implementing the ARIMA model is presented below:

$$Yt = c + \phi 1 Yt - 1 + \phi 2 Yt - 2 + \ldots + \theta 1 \epsilon t - 1 + \theta 2 \epsilon t - 2 + \ldots + \epsilon t Yt =$$
$$c + \phi 1 Yt - 1 + \phi 2 Yt - 2 + \ldots + \theta 1 \epsilon t - 1 + \theta 2 \epsilon t - 2 + \ldots + \epsilon t$$

For instance, the predictive failure identification module 420 may train a model to predict future failure occurrences based on historical failure patterns, where $YtYt$ represents the observed failure count at time $tt$ and $\epsilon t \epsilon t$ is white noise.

In some examples, leveraging time series forecasting models such as ARIMA or LSTM enables the system 400 to predict potential failure scenarios, thereby allowing organizations to take pre-emptive action and mitigate risks.

The auto-detection mechanisms 406 include one or more algorithms configured to monitor the pipeline, detect anomalies, and/or alerting users about anomalies and issues detected by interacting with the machine learning models 404. In the illustrated example, the auto-detection mechanisms 406 include a real-time monitoring module 422 and an auto-alerting module 424.

The real-time monitoring module 422 includes real-time monitoring mechanisms implemented to continuously monitor the health and performance of the CICD pipeline. These mechanisms collect and analyze various metrics such as error rates, deployment times, and resource utilization in real-time.

The auto-alerting module 424 includes one or more algorithms configured to perform one or more actions in response to detection of anomalies or potential issues in the CICD pipeline. When anomalies or potential issues are detected, auto-alerting mechanisms 424 trigger notifications to relevant stakeholders, such as developers, operations teams, or system administrators. These alerts provide timely information about potential issues, enabling swift action to be taken to address them.

Thus, the system 400 optimizes pipeline efficiency by prioritizing resolutions and proactively identifying potential failures. Furthermore, the system 400 enhances pipeline reliability by minimizing downtime and mitigating risks through proactive issue resolution. Furthermore, the system 400 improves code quality by providing actionable insights and recommendations during code review processes. Furthermore, the system 400 reduces operational costs associated with manual issue resolution and downtime, thereby improving the cost-effectiveness of CICD software development, integration, and deployment.

Figure 5:
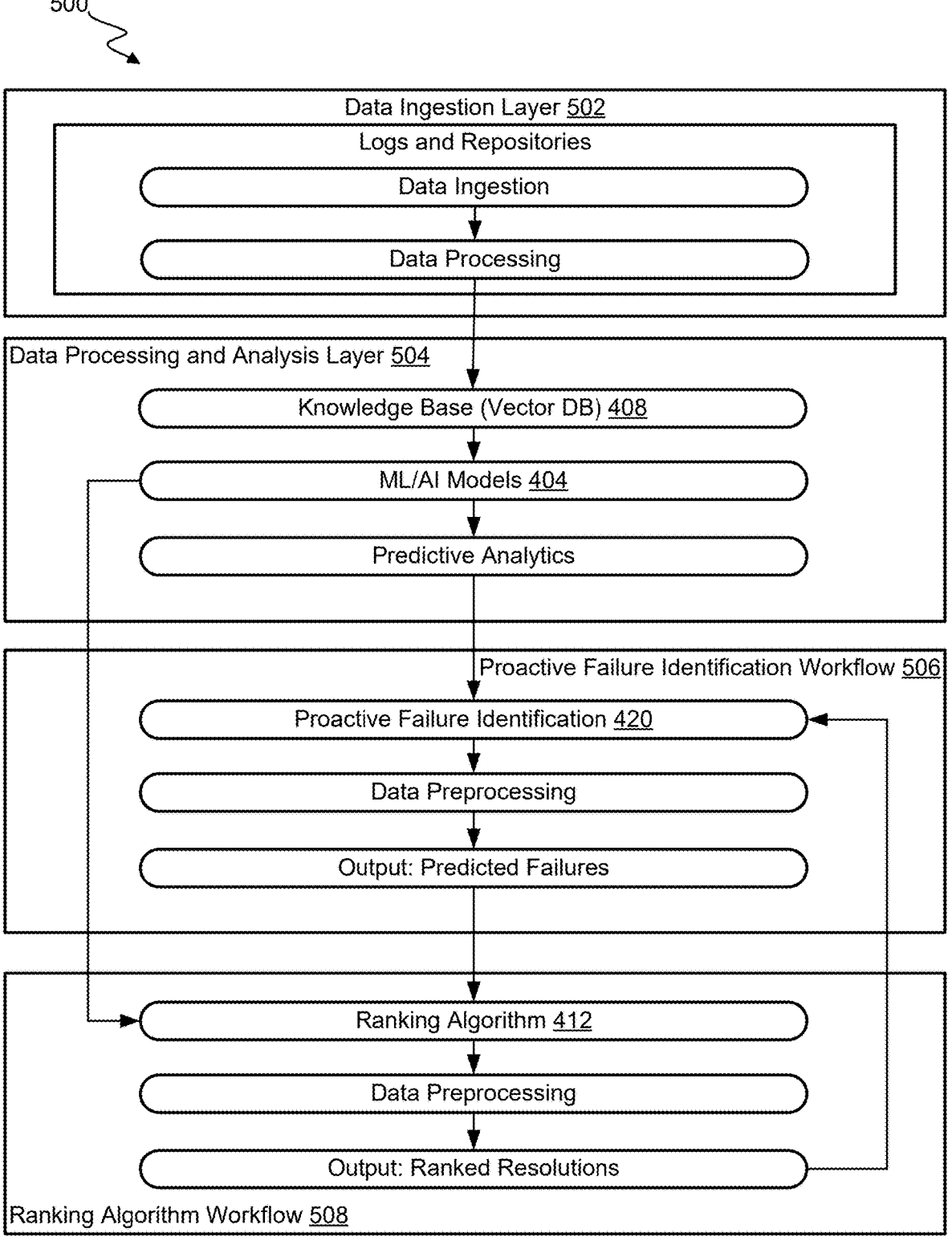
FIG. 5 illustrates a flow chart of an example process that proactively identifies failures and integrates various components of a CICD pipeline management system.

FIG. 5 illustrates a flow chart of an example process 500 that proactively identifies failures and integrates various components of the CICD pipeline management system 400. In general, the various components of the CICD pipeline management system 400 may be integrated into a cohesive system to allow seamless communication and collaboration among various users and developers of a CICD pipeline. In the illustrated example, the process 500 includes a data ingestion layer 502, a data processing and analysis layer 504, a proactive failure identification workflow 506, and a ranking algorithm workflow 508.

At the data ingestion layer 502, the process 500 involves data ingestion operations in which the system 400 collects data from multiple sources within the CICD pipeline, including error logs, deployment records, incident reports, and resolution notes. The system 400 also performs data processing operations in which the collected data is normalized, cleaned, and organized for storage in the issue knowledge database 408 according to one or more storage mechanisms (e.g., relational database, NoSQL database). Categorical features such as failure types and failure components are normalized and encoded to ensure consistency and compatibility with machine learning models. Textual data, such as failure descriptions and resolution details, may undergo preprocessing steps such as tokenization, stemming, and stop-word removal to extract meaningful information.

At the data processing and analysis layer 504, the process 500 involves incorporating feedback from users, historical data, and real-time monitoring (i.e., the data collected and processed in the data ingestion layer 502) into model training and optimization processes to improve the accuracy and relevancy of the ML/AI models 404. Anomaly alerts and auto-alerting triggers may also be fed back into the failure prediction component (e.g., 'predictive analytics') to refine prediction models 404.

At the proactive failure identification workflow 506, the process 500 involves performing the functions of the proactive failure identification module 420 (e.g., using an LLM model and RAG to predict failures). The process 500 may also include data preprocessing (e.g., time series data representing historical failure occurrences is preprocessed to remove trends and seasonality to improve stationarity) at the proactive failure identification workflow 506.

At the ranking algorithm workflow 508, the predicted failure information output from the proactive failure identification workflow 506 is used by the ranking algorithm 412 determine ranks of potential resolutions for the predicted failures. The predicted failures can be further refined by looping back the ranked resolutions to the proactive failure identification module 420 (e.g., by refining the ARIMA model when additional data is collected about success or failure of the recommended/ranked resolutions).

Figure 6:
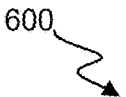
FIG. 6 illustrates a flow chart of an example process that implements various use cases that leverage looping feedback from various users and components of a CICD pipeline management system.

FIG. 6 illustrates a flow chart of an example process 600 that implements various use cases that leverage looping feedback from various users and components of the CICD pipeline management system 400.

In one example, the process 600 involves the system 400 generating a resolution ranking based on a user query. For instance, the user submits a query related to resolving a specific issue or failure in the CICD pipeline (e.g., user action). In response, the system 400 retrieves relevant historical data and dynamically ranks resolutions based on their success rates using the RankNet model (e.g., system response). The system 400 then presents the ranked resolutions to the user, thereby providing actionable recommendations for issue resolution (e.g., feedback).

In another example, the process 600 involves the system 400 performing an auto-detection and alerting operation. For instance, the automated monitoring module 422 continuously monitors pipeline health and performance in real-time. Anomaly detection algorithms 416 then identify deviations from expected behavior, such as increased error rates or prolonged deployment times. When anomalies are detected, the system triggers automated alerts to relevant stakeholders (e.g., via auto-alerting mechanisms 424) notifying them of potential issues.

In another example, the process 600 involves the system 400 performing smart code review integration operations. For instance, when a developer submits a code change for review (e.g., code review request), the system (e.g., smart code review module 414) automatically retrieves insights from the Issue Knowledge Base 408 and the RAG database 410. The system (e.g., via the smart code review module 414) may also analyze the code change and provide the reviewer with data-driven assessments of code quality based on historical failure patterns and resolutions (e.g., code quality assessment). The reviewer may then incorporate the provided insights into the code review process, thereby ensuring or increasing the likelihood that potential issues are identified and addressed proactively. (e.g. reviewer action).

Computer System Architecture

Figure 7:
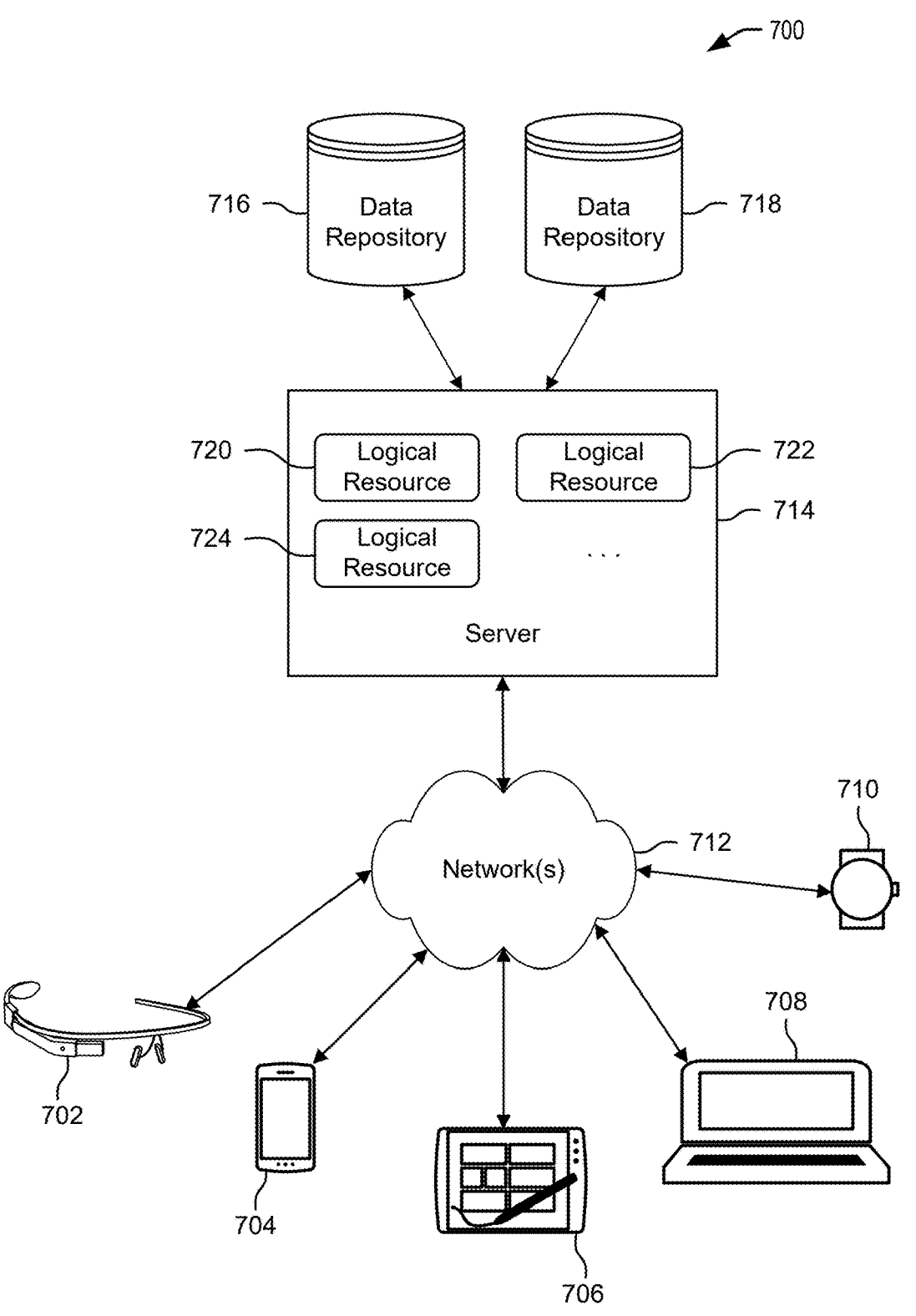
FIG. 7 depicts a simplified diagram of a distributed system for implementing certain aspects.

FIG. 7 depicts a simplified diagram of a distributed system 700 for implementing an embodiment. In the illustrated embodiment, distributed system 700 includes one or more client computing devices 702, 704, 706, 708, and/or 710 coupled to a server 714 via one or more communication networks 712. Clients computing devices 702, 704, 706, 708, and/or 710 may be configured to execute one or more applications.

In various aspects, server 714 may be adapted to run one or more services or software applications that enable techniques for integrating, deploying, and/or analyzing code or code issues.

In certain aspects, server 714 may also provide other services or software applications that can include non-virtual and virtual environments. In some aspects, these services may be offered as web-based or cloud services, such as under a Software as a Service (SaaS) model to the users of client computing devices 702, 704, 706, 708, and/or 710. Users operating client computing devices 702, 704, 706, 708, and/or 710 may in turn utilize one or more client applications to interact with server 714 to utilize the services provided by these components.

In the configuration depicted in FIG. 7, server 714 may include one or more components 720, 722 and 724 that implement the functions performed by server 714. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, 708, and/or 710 for techniques for integrating, deploying, and/or analyzing code or code issues in accordance with the teachings of this disclosure. A client device may provide an interface that enables a user of the client device to interact with the client device. The client device may also output information to the user via this interface. Although FIG. 7 depicts only five client computing devices, any number of client computing devices may be supported.

The client devices may include various types of computing systems such as smart phones or other portable handheld devices, general purpose computers such as personal computers and laptops, workstation computers, personal assistant devices, smart watches, smart glasses, or other wearable devices, equipment firmware, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux® or Linux-like operating systems such as Oracle® Linux and Google Chrome® OS) including various mobile operating systems (e.g., Microsoft Windows Mobile®, iOS®, Windows Phone®, Android®, HarmonyOS®, Tizen®, KaiOS®, Sailfish® OS, Ubuntu® Touch, CalyxOS®). Portable handheld devices may include cellular phones, smartphones, (e.g., an iPhone®), tablets (e.g., iPad®), and the like. Virtual personal assistants such as Amazon® Alexa®, Google Assistant, Microsoft® Cortana®, Apple® Siri®, and others may be implemented on devices with a microphone and/or camera to receive user or environmental inputs, as well as a speaker and/or display to respond to the inputs. Wearable devices may include Apple® Watch, Samsung Galaxy® Watch, Meta Quest®, Ray-Ban® Meta® smart glasses, Snap® Spectacles, and other devices. Gaming systems may include various handheld gaming devices, Internet-enabled gaming devices (e.g., a Microsoft Xbox® gaming console with or without a Kinect® gesture input device, Sony PlayStation® system, Nintendo Switch®, and other devices), and the like. The client devices may be capable of executing various different applications such as various Internet-related apps, communication applications (e.g., e-mail applications, short message service (SMS) applications) and may use various communication protocols.

Network(s) 712 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 712 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 100A2.11 suite of protocols, Bluetooth®, and/or any other wireless protocol), and/or any combination of these and/or other networks.

Server 714 may be composed of one or more general purpose computers, specialized server computers (including, by way of example, PC (personal computer) servers, UNIX® servers, LINIX® servers, mid-range servers, mainframe computers, rack-mounted servers, etc.), server farms, server clusters, a Real Application Cluster (RAC), database servers, or any other appropriate arrangement and/or combination. Server 714 can include one or more virtual machines running virtual operating systems, or other computing architectures involving virtualization such as one or more flexible pools of logical storage devices that can be virtualized to maintain virtual storage devices for the server. In various aspects, server 714 may be adapted to run one or more services or software applications that provide the functionality described in the foregoing disclosure.

The computing systems in server 714 may run one or more operating systems including any of those discussed above, as well as any commercially available server operating system. Server 714 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, SAP®, Amazon®, Sybase®, IBM® (International Business Machines), and the like.

In some implementations, server 714 may include one or more applications to analyze and consolidate data feeds and/or event updates received from users of client computing devices 702, 704, 706, 708, and/or 710. As an example, data feeds and/or event updates may include, but are not limited to, blog feeds, Threads® feeds, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 714 may also include one or more applications to display the data feeds and/or real-time events via one or more display devices of client computing devices 702, 704, 706, 708, and/or 710.

Distributed system 700 may also include one or more data repositories 716, 718. These data repositories may be used to store data and other information in certain aspects. For example, one or more of the data repositories 716, 718 may be used to store information for techniques for integrating, deploying, and/or analyzing code or code issues. Data repositories 716, 718 may reside in a variety of locations. For example, a data repository used by server 714 may be local to server 714 or may be remote from server 714 and in communication with server 714 via a network-based or dedicated connection. Data repositories 716, 718 may be of different types. In certain aspects, a data repository used by server 714 may be a database, for example, a relational database, a container database, an Exadata® storage device, or other data storage and retrieval tool such as databases provided by Oracle Corporation® and other vendors. One or more of these databases may be adapted to enable storage, update, and retrieval of data to and from the database in response to structured query language (SQL)-formatted commands.

In certain aspects, one or more of data repositories 716, 718 may also be used by applications to store application data. The data repositories used by applications may be of different types such as, for example, a key-value store repository, an object store repository, or a general storage repository supported by a file system.

In one embodiment, server 714 is part of a cloud-based system environment in which various services may be offered as cloud services, for a single tenant or for multiple tenants where data, requests, and other information specific to the tenant are kept private from each tenant. In the cloud-based system environment, multiple servers may communicate with each other to perform the work requested by client devices from the same or multiple tenants. The servers communicate on a cloud-side network that is not accessible to the client devices in order to perform the requested services and keep tenant data confidential from other tenants.

Figure 8:
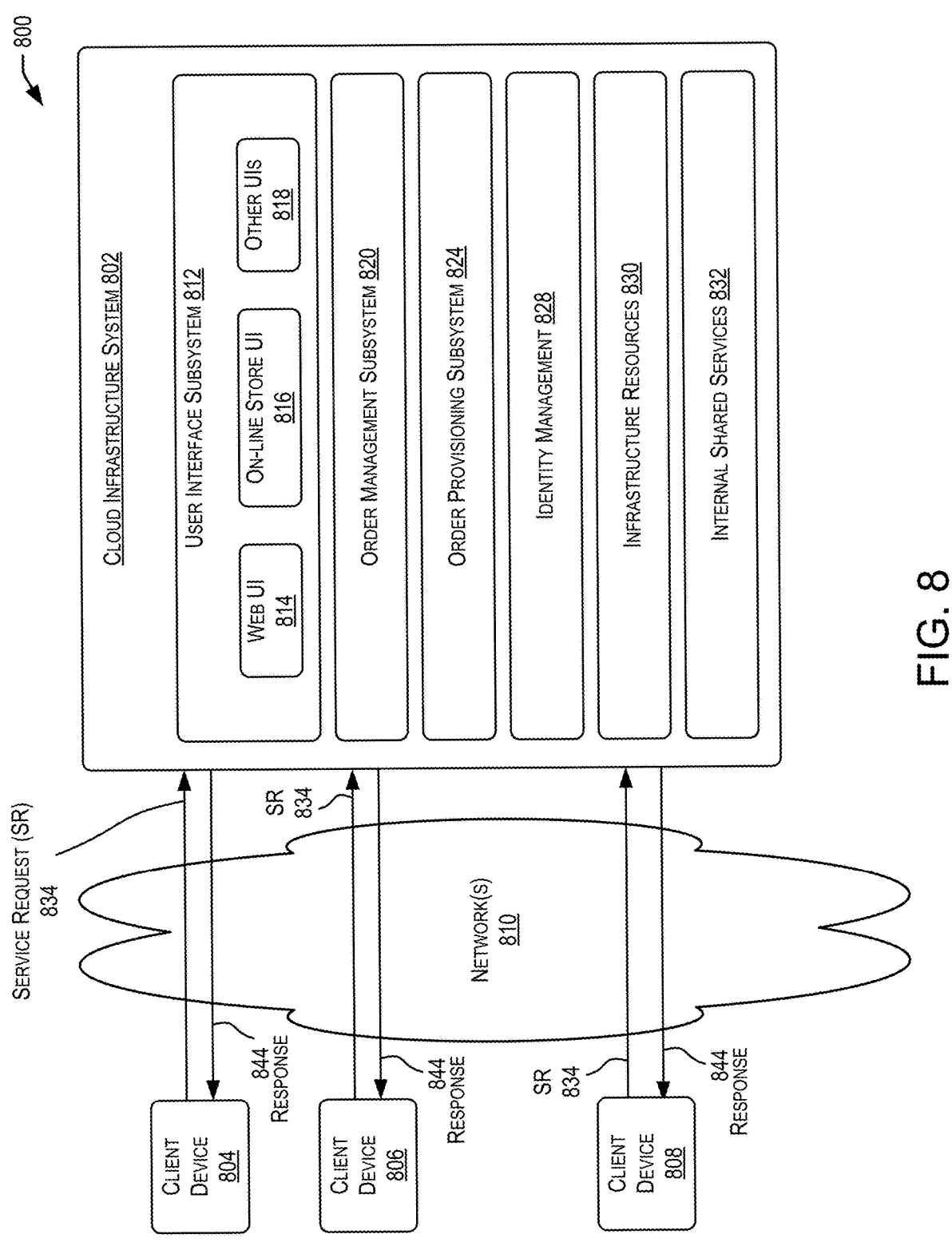
FIG. 8 is a simplified block diagram of one or more components of a system environment by which services provided by one or more components of an embodiment system may be offered as cloud services, in accordance with certain aspects.

FIG. 8 is a simplified block diagram of a cloud-based system environment in which code or code issues may be integrated, deployed, and/or analyzed, in accordance with certain aspects. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 714. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other aspects, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative aspects.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the cloud customer's ("tenant's") own on-premise servers and systems. The cloud service provider's systems are managed by the cloud service provider. Tenants can thus avail themselves of cloud services provided by a cloud service provider without having to purchase separate licenses, support, or hardware and software resources for the services. For example, a cloud service provider's system may host an application, and a user may, via a network 810 (e.g., the Internet), on demand, order and use the application without the user having to buy infrastructure resources for executing the application. Cloud services are designed to provide easy, scalable access to applications, resources, and services. Several providers offer cloud services. For example, several cloud services are offered by Oracle Corporation®, such as database services, middleware services, application services, and others.

In certain aspects, cloud infrastructure system 802 may provide one or more cloud services using different models such as under a Software as a Service (SaaS) model, a Platform as a Service (PaaS) model, an Infrastructure as a Service (IaaS) model, a Data as a Service (DaaS) model, and others, including hybrid service models. Cloud infrastructure system 802 may include a suite of databases, middleware, applications, and/or other resources that enable provision of the various cloud services.

A SaaS model enables an application or software to be delivered to a tenant's client device over a communication network like the Internet, as a service, without the tenant having to buy the hardware or software for the underlying application. For example, a SaaS model may be used to provide tenants access to on-demand applications that are hosted by cloud infrastructure system 802. Examples of SaaS services provided by Oracle Corporation® include, without limitation, various services for human resources/capital management, client relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware, and networking resources) to a tenant as a cloud service to provide elastic compute and storage capabilities. Various IaaS services are provided by Oracle Corporation®.

A PaaS model is generally used to provide, as a service, platform and environment resources that enable tenants to develop, run, and manage applications and services without the tenant having to procure, build, or maintain such resources. Examples of PaaS services provided by Oracle Corporation® include, without limitation, Oracle Database Cloud Service (DBCS), Oracle Java Cloud Service (JCS), data management cloud service, various application development solutions services, and others.

A DaaS model is generally used to provide data as a service. Datasets may searched, combined, summarized, and downloaded or placed into use between applications. For example, user profile data may be updated by one application and provided to another application. As another example, summaries of user profile information generated based on a dataset may be used to enrich another dataset.

Cloud services are generally provided on an on-demand self-service basis, subscription-based, elastically scalable, reliable, highly available, and secure manner. For example, a tenant, via a subscription order, may order one or more services provided by cloud infrastructure system 802. Cloud infrastructure system 802 then performs processing to provide the services requested in the tenant's subscription order. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public tenant, where the tenant can be an individual or an enterprise. In certain other aspects, under a private cloud model, cloud infrastructure system 802 may be operated within an organization (e.g., within an enterprise organization) and services provided to clients that are within the organization. For example, the clients may be various departments or employees or other individuals of departments of an enterprise such as the Human Resources department, the Payroll department, etc., or other individuals of the enterprise. In certain other aspects, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802.

In some aspects, the processing performed by cloud infrastructure system 802 for providing chatbot services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for determining the intent of an utterance. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain aspects, to facilitate efficient provisioning of these resources for supporting the various cloud services provided by cloud infrastructure system 802 for different tenants, the resources may be bundled into sets of resources or resource modules (also referred to as "pods"). Each resource module or pod may comprise a pre-integrated and optimized combination of resources of one or more types. In certain aspects, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a tenant may, using a client device, request (service request 834) one or more services provided by cloud infrastructure system 802 using one or more of interfaces 814, 816, and 818. For example, a tenant may access the online store, browse cloud services offered by cloud infrastructure system 802, and place a subscription order for one or more services offered by cloud infrastructure system 802 that the tenant wishes to subscribe to. The service request may include information identifying the tenant and one or more services that the tenant desires to subscribe to. For example, a tenant may place a subscription order for a chatbot related service offered by cloud infrastructure system 802. As part of the order, the client may provide information identifying the input (e.g. utterances).

In certain aspects, such as the embodiment depicted in FIG. 8, cloud infrastructure system 802 may comprise an order management subsystem (OMS) 820 that is configured to process the new order. As part of this processing, OMS 820 may be configured to: create an account for the tenant, if not done already; receive billing and/or accounting information from the tenant that is to be used for billing the tenant for providing the requested service to the tenant; verify the tenant information; upon verification, book the order for the tenant; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the tenant order. The manner in which resources are provisioned for an order and the type of the provisioned resources may depend upon the type of cloud service that has been ordered by the tenant. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting tenant for providing the requested service.

Cloud infrastructure system 802 may send a response or notification 844 to the requesting tenant to indicate when the requested service is now ready for use. In some instances, information (e.g., a link) may be sent to the tenant that enables the tenant to start using and availing the benefits of the requested services.

Cloud infrastructure system 802 may provide services to multiple tenants. For each tenant, cloud infrastructure system 802 is responsible for managing information related to one or more subscription orders received from the tenant, maintaining tenant data related to the orders, and providing the requested services to the tenant or clients of the tenant. Cloud infrastructure system 802 may also collect usage statistics regarding a tenant's use of subscribed services. For example, statistics may be collected for the amount of storage used, the amount of data transferred, the number of users, and the amount of system up time and system down time, and the like. This usage information may be used to bill the tenant. Billing may be done, for example, on a monthly cycle.

Cloud infrastructure system 802 may provide services to multiple tenants in parallel. Cloud infrastructure system 802 may store information for these tenants, including possibly proprietary information. In certain aspects, cloud infrastructure system 802 comprises an identity management subsystem (IMS) 828 that is configured to manage tenant's information and provide the separation of the managed information such that information related to one tenant is not accessible by another tenant. IMS 828 may be configured to provide various security-related services such as identity services, such as information access management, authentication and authorization services, services for managing tenant identities and roles and related capabilities, and the like.

Figure 9:
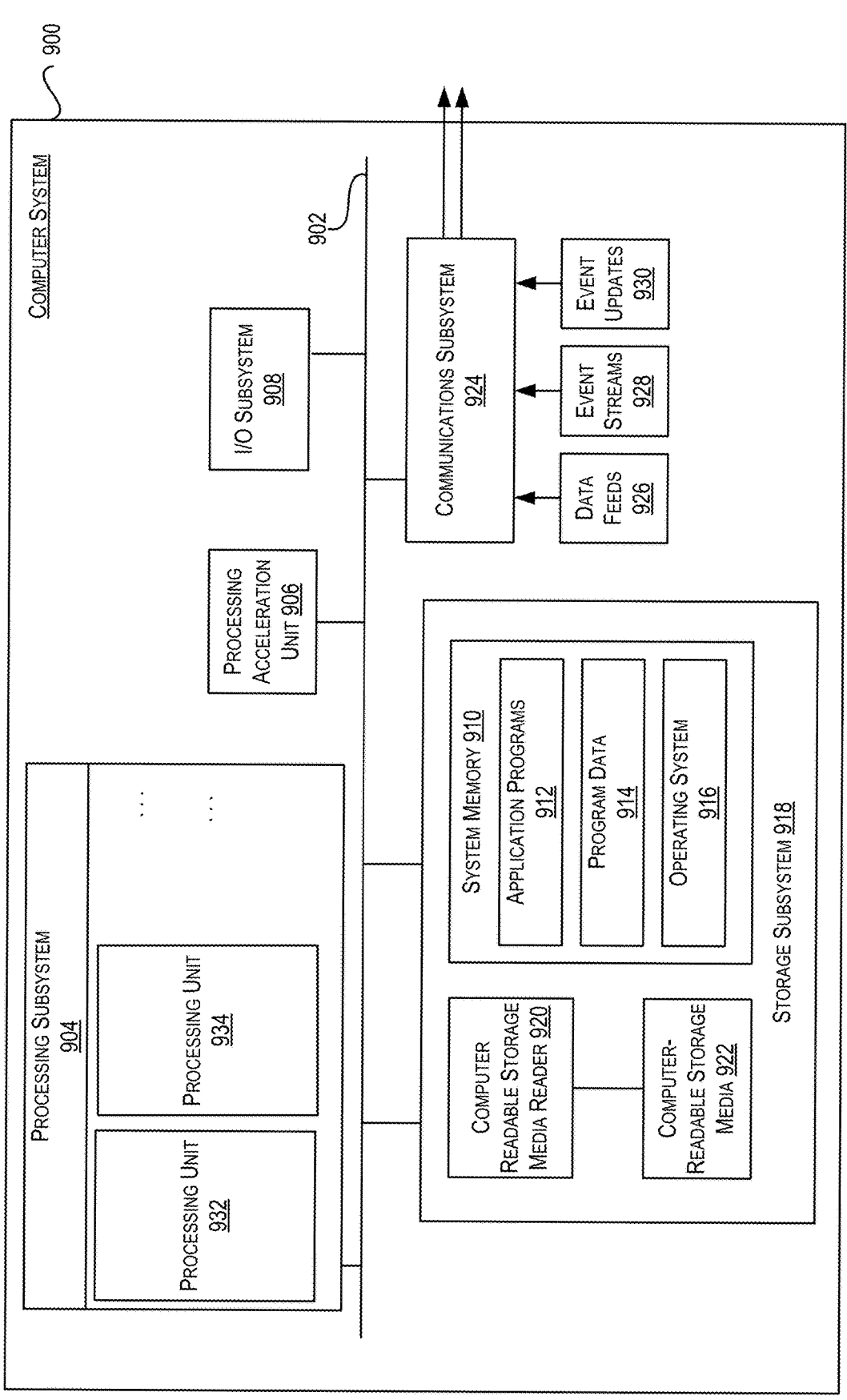
FIG. 9 illustrates an example computer system that may be used to implement certain aspects.

FIG. 9 illustrates an exemplary computer system 900 that may be used to implement certain aspects. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative aspects of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some aspects, processing subsystem 904 can include one or more special purpose co-processors such as graphics processors, digital signal processors (DSPs), or the like. In some aspects, some or all of the processing units of processing subsystem 904 can be implemented using customized circuits, such as application specific integrated circuits (ASICs), or field programmable gate arrays (FPGAs).

In some aspects, the processing units in processing subsystem 904 can execute instructions stored in system memory 910 or on computer readable storage media 922. In various aspects, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain aspects, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Meta Quest® controller, Microsoft Kinect® motion sensor, the Microsoft Xbox® 360 game controller, or devices that provide an interface for receiving input using gestures and spoken commands. User interface input devices may also include eye gesture recognition devices such as a blink detector that detects eye activity (e.g., "blinking" while taking pictures and/or making a menu selection) from users and transforms the eye gestures as inputs to an input device. Additionally, user interface input devices may include voice recognition sensing devices that enable users to interact with voice recognition systems (e.g., Siri® navigator or Amazon Alexa®) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, QR code readers, barcode readers, 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be any device for outputting a digital picture. Example display devices include flat panel display devices such as those using a light emitting diode (LED) display, a liquid crystal display (LCD) or plasma display, a projection device, a touch screen, a desktop or laptop computer monitor, and the like. As another example, wearable display devices such as Meta Quest® or Microsoft HoloLens® may be mounted to the user for displaying information. User interface output devices may include, without limitation, a variety of display devices that visually convey text, graphics, and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some aspects. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux® operating systems, a variety of commercially-available UNIX® or UNIX-like operating systems (including without limitation the variety of GNU/Linux operating systems, the Oracle Linux®, Google Chrome® OS, and the like) and/or mobile operating systems such as iOS, Windows® Phone, Android® OS, and others.

Computer-readable storage media 922 may store programming and data constructs that provide the functionality of some aspects. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, digital video disc (DVD), a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, dynamic random access memory (DRAM)-based SSDs, magnetoresistive RAM (MRAM) SSDs, and hybrid SSDs that use a combination of DRAM and flash memory based SSDs.

In certain aspects, storage subsystem 918 may also include a computer-readable storage media reader 920 that can further be connected to computer-readable storage media 922. Reader 920 may receive and be configured to read data from a memory device such as a disk, a flash drive, etc.

In certain aspects, computer system 900 may support virtualization technologies, including but not limited to virtualization of processing and memory resources. For example, computer system 900 may provide support for executing one or more virtual machines. In certain aspects, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communications subsystem may be used to transmit a response to a user regarding the inquiry for a chatbot.

Communications subsystem 924 may support both wired and/or wireless communication protocols. For example, in certain aspects, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), Wi-Fi (IEEE 802.XX family standards, or other mobile communication technologies, or any combination thereof), global positioning system (GPS) receiver components, and/or other components. In some aspects communications subsystem 924 can provide wired network connectivity (e.g., Ethernet) in addition to or instead of a wireless interface.

Communications subsystem 924 can receive and transmit data in various forms. For example, in some aspects, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain aspects, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a personal digital assistant (PDA)), a wearable device (e.g., a Meta Quest® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art can appreciate other ways and/or methods to implement the various aspects.

Although specific aspects have been described, various modifications, alterations, alternative constructions, and equivalents are possible. Embodiments are not restricted to operation within certain specific data processing environments, but are free to operate within a plurality of data processing environments. Additionally, although certain aspects have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described aspects may be used individually or jointly.

Further, while certain aspects have been described using a particular combination of hardware and software, it should be recognized that other combinations of hardware and software are also possible. Certain aspects may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the aspects. However, aspects may be practiced without these specific details. For example, well-known circuits, processes, algorithms, structures, and techniques have been shown without unnecessary detail in order to avoid obscuring the aspects. This description provides example aspects only, and is not intended to limit the scope, applicability, or configuration of other aspects. Rather, the preceding description of the aspects can provide those skilled in the art with an enabling description for implementing various aspects. Various changes may be made in the function and arrangement of elements.

The specification and drawings are, accordingly, to be regarded in an illustrative rather than a restrictive sense. It can, however, be evident that additions, subtractions, deletions, and other modifications and changes may be made thereunto without departing from the broader spirit and scope as set forth in the claims. Thus, although specific aspects have been described, these are not intended to be limiting. Various modifications and equivalents are within the scope of the following claims.

What is claimed is:

1. A computer-implemented method comprising:

accessing, in a code inquiry session, a request comprising natural language content requesting information about code;

generating a request vector embedding representing the request based at least in part on the natural language content;

accessing content vector embeddings representing a plurality of items of code-related content that provide information about a plurality of sets of code; wherein the content vector embeddings comprise numerical values that encode categorical features of the plurality of items of code-related content; wherein the categorical features comprise a failure type determined prior to encoding the categorical features;

determining a plurality of distances between the content vector embeddings and the request vector embedding;

based at least in part on the plurality of distances, selecting, to support communication with a large language model, a subset of the plurality of items of code-related content that provide information about at least one set of code at least in part by identifying one or more items of code-related content having particular content vector embeddings that are closest, in vector distance, to the request vector embedding; wherein the one or more items of code-related content comprise a particular item of code-related content;

generating, using retrieval augmented generation (RAG), a prompt for execution at least in part by the large language model, wherein the prompt comprises:

at least some of the natural language content requesting information about code, and at least some information from each item of code-related content in the subset of the plurality of items of code-related content, including particular information about the particular item of code-related content;

prompting the large language model with the prompt;

accessing a result comprising at least part of a natural language response based at least in part on the execution; and based at least in part on the result, storing, in association with the code inquiry session, the natural language response to the request that identifies one or more issues and one or more sets of code and explains how the one or more issues were resolved for the one or more sets of code and how the one or more issues or the one or more sets of code are relevant to the requested information about code, wherein the particular item of code-related content is about the one or more issues or the one or more sets of code.

2. The computer-implemented method of claim 1, further comprising causing display of the response on a user interface that results from a submission of a user query from an authenticated user to an input region as part of the code inquiry session with the authenticated user.

3. The computer-implemented method of claim 1, further comprising:

determining one or more sibling sets of code that are functionally parallel to the code for which information is requested by the natural language content, wherein the prompt further comprises information about the one or more sibling sets of code.

4. The computer-implemented method of claim 1, further comprising:

determining one or more sibling sets of code that are functionally parallel to a particular set of code having a particular issue identified by the natural language content, wherein the prompt further comprises information about the one or more sibling sets of code.

5. The computer-implemented method of claim 1, further comprising:

determining, using a machine learning model other than the large language model, two or more rank scores of two or more resolutions associated with the one or more issues based on the response; and selecting, based on the two or more rank scores, a recommended resolution for an issue identified by the large language model based at least in part on the natural language content.

6. The computer-implemented method of claim 1, wherein the plurality of items of code-related content comprises content describing functionality of the plurality of sets of code, the computer-implemented method further comprising:

determining the one or more issues.

7. The computer-implemented method of claim 1, wherein the plurality of items of code-related content comprises content describing functionality of at least one of the plurality of sets of code, the computer-implemented method further comprising:

determining at least one issue of the one or more issues based at least in part on a stored association between at least one set of code and the at least one issue, wherein the prompt further comprises an identification of the at least one issue and the at least one set of code associated with the at least one issue.

8. The computer-implemented method of claim 1, wherein the plurality of items of code-related content comprises content describing at least one issue of the one or more issues, the computer-implemented method further comprising:

determining the one or more sets of code.

9. The computer-implemented method of claim 1, wherein the plurality of items of code-related content comprises content describing at least one issue of the one or more issues, the computer-implemented method further comprising:

determining at least one set of code of the one or more sets of code based at least in part on a stored association between the at least one set of code and the at least one issue, wherein the prompt further comprises an identification of the at least one issue and the at least one set of code associated with the at least one issue.

10. The computer-implemented method of claim 1, wherein the plurality of items of code-related content comprises content describing a dependency of at least one of the plurality of sets of code, the computer-implemented method further comprising:

selecting the subset of the plurality of items of code-related content further based on the dependency.

11. A computer-program product comprising one or more non-transitory machine-readable storage media, including stored instructions configured to cause a computing system to perform a set of actions including:

accessing, in a code inquiry session, a request comprising natural language content requesting information about code;

generating a request vector embedding representing the request based at least in part on the natural language content;

accessing content vector embeddings representing a plurality of items of code-related content that provide information about a plurality of sets of code; wherein the content vector embeddings comprise numerical values that encode categorical features of the plurality of items of code-related content; wherein the categorical features comprise a failure type determined prior to encoding the categorical features determining a plurality of distances between the content vector embeddings and the request vector embedding;

based at least in part on the plurality of distances, selecting, to support communication with a large language model, a subset of the plurality of items of code-related content that provide information about at least one set of code at least in part by identifying one or more items of code-related content having particular content vector embeddings that are closest, in vector distance, to the request vector embedding; wherein the one or more items of code-related content comprise a particular item of code-related content;

generating, using retrieval augmented generation (RAG), a prompt for execution at least in part by the large language model, wherein the prompt comprises:

at least some of the natural language content requesting information about code, and at least some information from each item of code-related content in the subset of the plurality of items of code-related content, including particular information about the particular item of code-related content;

prompting the large language model with the prompt;

accessing a result comprising at least part of a natural language response based at least in part on the execution; and based at least in part on the result, storing, in association with the code inquiry session, the natural language response to the request that identifies one or more issues and one or more sets of code and explains how the one or more issues were resolved for the one or more sets of code and how the one or more issues or the one or more sets of code are relevant to the requested information about code, wherein the particular item of code-related content is about the one or more issues or the one or more sets of code.

12. The computer-program product of claim 11, wherein the set of actions further includes:

based at least in part on the response, causing display of the information on a user interface that results from a submission of a user query from an authenticated user to an input region as part of the code inquiry session with the authenticated user.

13. The computer-program product of claim 11, wherein the set of actions further includes:

determining one or more sibling sets of code that are functionally parallel to the code for which information is requested by the natural language content, wherein the prompt further comprises information about the one or more sibling sets of code.

14. The computer-program product of claim 11, wherein the set of actions further includes:

determining one or more sibling sets of code that are functionally parallel to a particular set of code having a particular issue identified by the natural language content, wherein the prompt further comprises information about the one or more sibling sets of code.

15. The computer-program product of claim 11, wherein the set of actions further includes:

determining, using a machine learning model other than the large language model, two or more rank scores of two or more resolutions associated with the one or more issues based on the response; and selecting, based on the two or more rank scores, a recommended resolution for an issue identified by the large language model based at least in part on the natural language content.

16. A system comprising:

one or more processors;

one or more non-transitory computer-readable media storing instructions, which, when executed by the system, cause the system to perform a set of actions including:

accessing, in a code inquiry session, a request comprising natural language content requesting information about code;

generating a request vector embedding representing the request based at least in part on the natural language content;

accessing content vector embeddings representing a plurality of items of code-related content that provide information about a plurality of sets of code; wherein the content vector embeddings comprise numerical values that encode categorical features of the plurality of items of code-related content; wherein the categorical features comprise a failure type determined prior to encoding the categorical features determining a plurality of distances between the content vector embeddings and the request vector embedding;

based at least in part on the plurality of distances, selecting, to support communication with a large language model, a subset of the plurality of items of code-related content that provide information about at least one set of code at least in part by identifying one or more items of code-related content having particular content vector embeddings that are closest, in vector distance, to the request vector embedding; wherein the one or more items of code-related content comprise a particular item of code-related content;

generating, using retrieval augmented generation (RAG), a prompt for execution at least in part by the large language model, wherein the prompt comprises:

at least some of the natural language content requesting information about code, and at least some information from each item of code-related content in the subset of the plurality of items of code-related content, including particular information about the particular item of code-related content;

prompting the large language model with the prompt;

accessing a result comprising at least part of a natural language response based at least in part on the execution; and based at least in part on the result, storing, in association with the code inquiry session, the natural language response to the request that identifies one or more issues and one or more sets of code and explains how the one or more issues were resolved for the one or more sets of code and how the one or more issues or the one or more sets of code are relevant to the requested information about code, wherein the particular item of code-related content is about the one or more issues or the one or more sets of code.

17. The system of claim 16, wherein the set of actions further includes:

based at least in part on the response, causing display of the information on a user interface that results from a submission of a user query from an authenticated user to an input region as part of the code inquiry session with the authenticated user.

18. The system of claim 16, wherein the set of actions further includes:

determining one or more sibling sets of code that are functionally parallel to the code for which information is requested by the natural language content, wherein the prompt further comprises information about the one or more sibling sets of code.

19. The system of claim 16, wherein the set of actions further includes:

determining one or more sibling sets of code that are functionally parallel to a particular set of code having a particular issue identified by the natural language content, wherein the prompt further comprises information about the one or more sibling sets of code.

20. The system of claim 16, wherein the set of actions further includes:

determining, using a machine learning model other than the large language model, two or more rank scores of two or more resolutions associated with the one or more issues based on the response; and selecting, based on the two or more rank scores, a recommended resolution for an issue identified by the large language model based at least in part on the natural language content.

21. The computer-implemented method of claim 1, wherein the plurality of items of code-related content further comprise failure descriptions and resolution details that are tokenized to generate the content vector embeddings.

22. The computer-program product of claim 11, wherein the plurality of items of code-related content further comprise failure descriptions and resolution details that are tokenized to generate the content vector embeddings.

23. The system of claim 16, wherein the plurality of items of code-related content further comprise failure descriptions and resolution details that are tokenized to generate the content vector embeddings.

* * * * *